US007969632B2

(12) United States Patent
Tanaka et al.

(10) Patent No.: US 7,969,632 B2
(45) Date of Patent: Jun. 28, 2011

(54) FABRICATION METHOD FOR A COMPUTER-GENERATED HOLOGRAM IN WHICH A THREE-DIMENSIONAL OBJECT HAVING VISUALIZED CROSS-SECTIONAL SURFACES IS RECORDED, AND COMPUTER-GENERATED HOLOGRAM IN WHICH A THREE-DIMENSIONAL OBJECT HAVING VISUALIZED CROSS-SECTIONAL SURFACES IS RECORDED

(75) Inventors: Akiko Tanaka, Tokyo (JP); Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/503,796

(22) Filed: Jul. 15, 2009

(65) Prior Publication Data
US 2010/0014135 A1 Jan. 21, 2010

Related U.S. Application Data

(62) Division of application No. 10/595,221, filed as application No. PCT/JP2004/016711 on Nov. 4, 2004, now Pat. No. 7,580,170.

(30) Foreign Application Priority Data

Nov. 4, 2003 (JP) ................................. 2003-374001

(51) Int. Cl.
*G03H 1/08* (2006.01)
(52) U.S. Cl. ............................. 359/9; 345/421; 345/619
(58) Field of Classification Search ........................ None
See application file for complete search history.

(56) References Cited

U.S. PATENT DOCUMENTS

| 3,614,426 | A | 10/1971 | Donzelle |
| 5,400,155 | A | 3/1995 | Ueda et al. |
| 6,748,347 | B1 | 6/2004 | Dalton |
| 6,927,886 | B2 | 8/2005 | Plesniak et al. |
| 2003/0151784 | A1* | 8/2003 | Kitamura et al. ................. 359/3 |

FOREIGN PATENT DOCUMENTS

| JP | 59-60680 | 4/1984 |
| JP | 7-261649 | 10/1995 |
| JP | 2001-109362 | 3/2001 |
| JP | 2003-186378 | 7/2003 |

OTHER PUBLICATIONS

English Translation of JP 59-06080, Koichi, published Apr. 6, 1984.*

* cited by examiner

*Primary Examiner* — Stephone B Allen
*Assistant Examiner* — Derek S Chapel
(74) *Attorney, Agent, or Firm* — patenttm.us

(57) ABSTRACT

A method for fabricating a computer generated hologram or holographic stereogram can reconstruct a three-dimensional object having visualized cross-sectional surfaces, wherein three-dimensional object composed only of surface data is processed to have visualized cross-sectional surfaces on a given cross section thereof by adding surface data to cross-sectional surfaces. The method includes obtaining volume data of a three-dimensional object, obtaining a number of two-dimensional cross-sectional image data of the three-dimensional object, producing three-dimensional object image data composed only of surface data of the three-dimensional object from the two-dimensional cross-sectional data obtained above, cutting the three-dimensional object surface data along predetermined cross section, defining the shape by adding surface data representing cross-sectional surfaces on the cut cross section, defining the arrangement of the defined three-dimensional object, a hologram plan and a reference beam to compute interference fringes on the hologram plane, and recording the interference fringes on a recording medium.

5 Claims, 20 Drawing Sheets

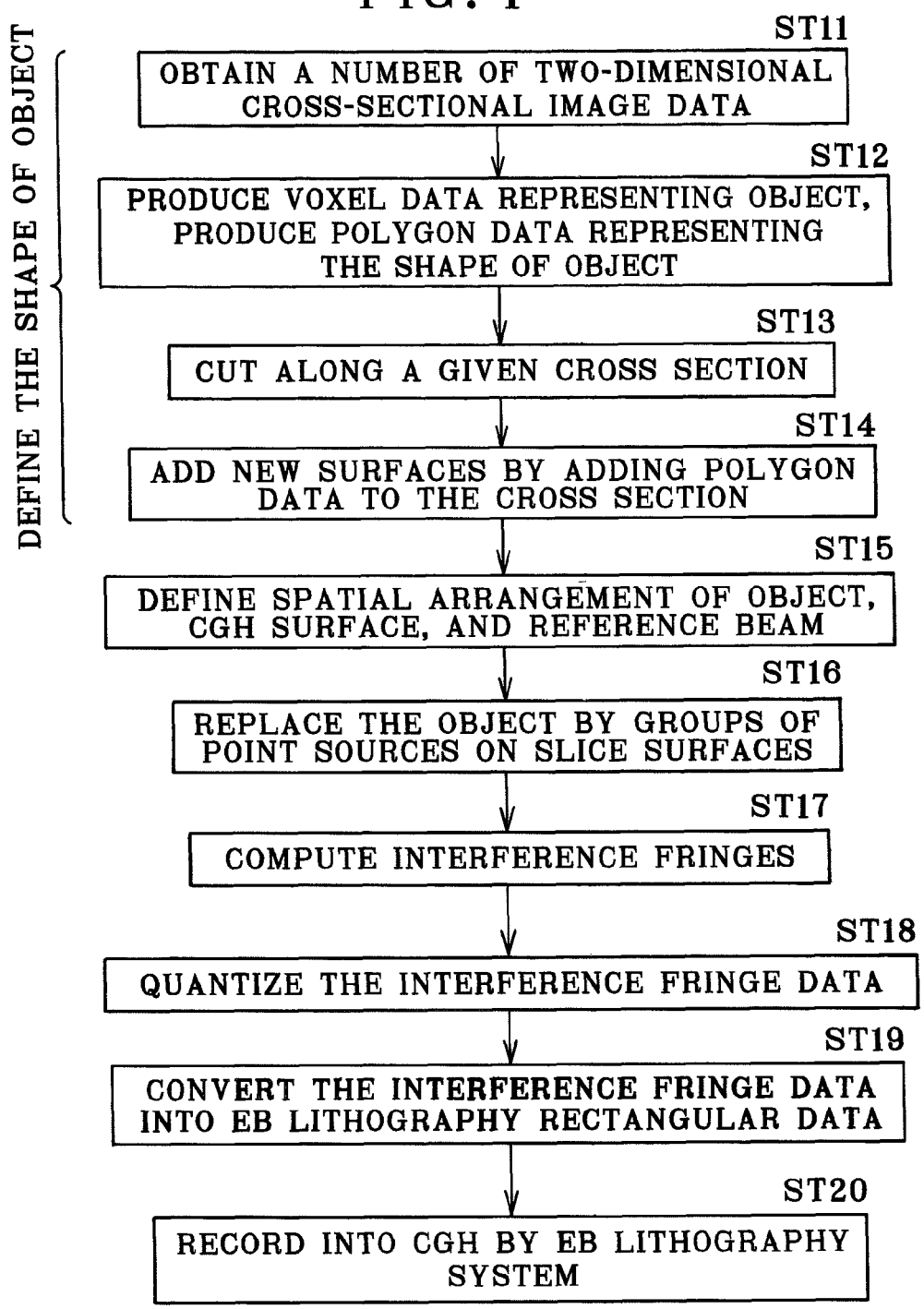

3

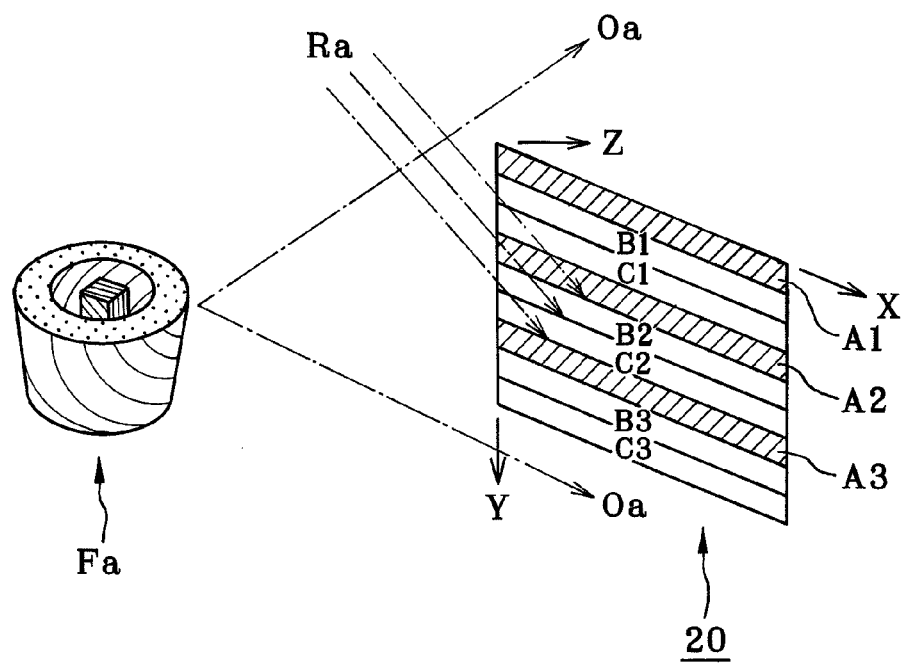
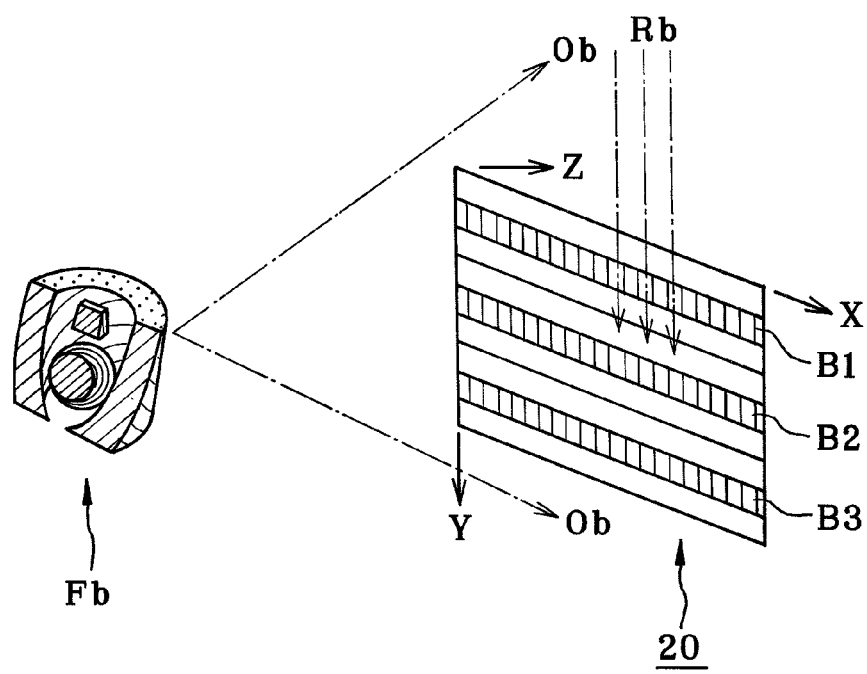

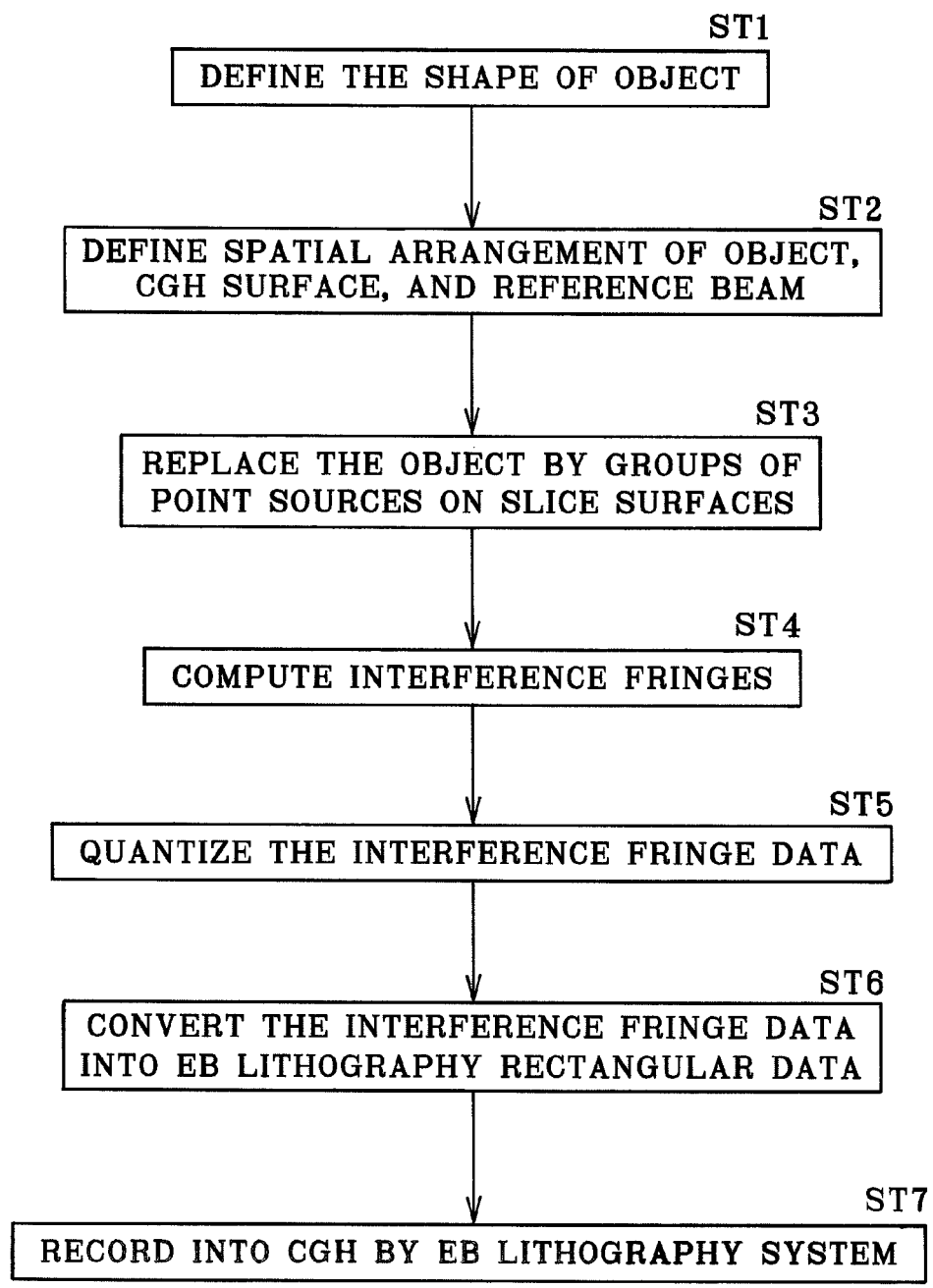

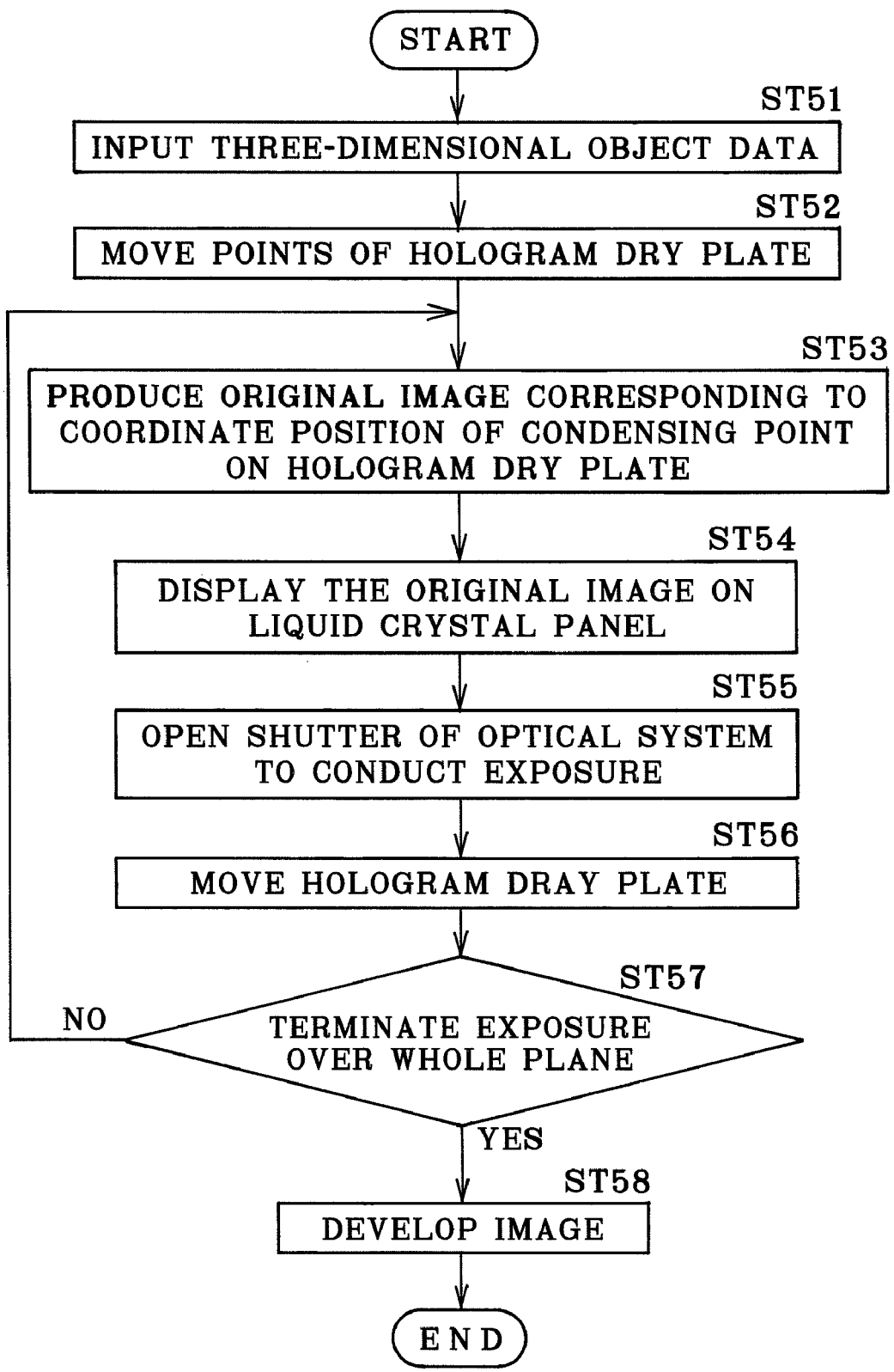

FABRICATION METHOD FOR A COMPUTER-GENERATED HOLOGRAM IN WHICH A THREE-DIMENSIONAL OBJECT HAVING VISUALIZED CROSS-SECTIONAL SURFACES IS RECORDED, AND COMPUTER-GENERATED HOLOGRAM IN WHICH A THREE-DIMENSIONAL OBJECT HAVING VISUALIZED CROSS-SECTIONAL SURFACES IS RECORDED

TECHNICAL FIELD

The present invention relates to a fabrication method for a computer-generated hologram (CGH) or a holographic stereogram in which a three-dimensional object having visualized cross-sectional surfaces is recorded, and a computer-generated hologram and a holographic stereogram in which a three-dimensional object having visualized cross-sectional surfaces is recorded. More particularly, the present invention relates to a method for recording a three-dimensional object composed of three-dimensional measured data as a computer-generated hologram or a holographic stereogram, wherein the computer-generated hologram or the holographic stereogram is processed to enable a given cross section of the three-dimensional object to be observed, and relates to a computer-generated hologram and a holographic stereogram thus fabricated.

BACKGROUND OF THE ART

Generally, examples of measuring devices for observing internal structures include an X-ray CT (X-ray Computer Tomography), an MRI (Magnetic Resonance Imaging), and a TEM (Transmittance Electron Microscope). Nowadays, a technology, in which a plurality of two-dimensional sectional image data of a target obtained by one of such measuring devices are processed to enable a three-dimensional structure of the target to be observed, has been proposed (Non-patent document 1).

Since a two-dimensional image display such as a CRT display should be used as a device for displaying the thus obtained three-dimensional structure, however, the image actually observed is a two-dimensional image even if the display shows the three-dimensional structure.

Besides, since the three-dimensional structure obtained by processing the two-dimensional cross sectional image data is composed only of surface data of the three-dimensional object (the target), cross-sectional surfaces obtained by cutting the three-dimensional image along a given cross section must be shown only by their outlines, that is, the three-dimensional image displayed can not have normal cross-sectional surfaces.

Moreover, it is impossible to record such three-dimensional structure in a three-dimensional display medium for the purpose of distribution and the like.

Patent Document 1

Japanese Patent Unexamined Publication No. 2001-109362

Patent Document 2

Japanese Patent Unexamined Publication No. 2002-204796

Patent Document 3

Japanese Patent Unexamined Publication No. 2004-264839

Patent Document 4

Japanese Patent Unexamined Publication No. 2002-72837

Patent Document 5

Japanese Patent Unexamined Publication No. S52 (1977)-4855

Patent Document 6

Japanese patent No. 2,884,646

Patent Document 7

Japanese Patent Unexamined Publication No. H06 (1994)-266274

Patent Document 8

Japanese Patent Unexamined Publication No. H07 (1995)-261649

Patent Document 9

Japanese Patent Unexamined Publication No. 2001-318578

Non-Patent Document 1

Phys. Rev. Lett., 84, pp. 518-521, 2000

Non-Patent Document 2

"3D Image Conference '99" collected lecture articles CD-ROM (Jun. 30 to Jul. 1, 1999 Kogakuin university Shinjyuku campus), "Image type binary CGH by EB printing (3)—Improvement of stereoscopic effect by hidden surface removal and shading—"

Non-Patent Document 3

J. Optical Society of America, A/Vol. 1 (6), (1984), pp. 612-619

Non-Patent Document 4

"Functional materials" 2002 October issue (Vol. 22, No. 10), pp. 11-19

Non-Patent Document 5

"Physics Sampler 22. Holography" written by Junpei Tsujiuchi pp. 33-36 (issued by Shokabo Publishing Co., Ltd. (Nov. 5, 1997)

Non-Patent Document 6

The $20^{th}$ image conference collected papers pp. 323-326 (1989)

Non-Patent Document 7

The $21^{st}$ image conference collected papers pp. 243-246 (1990)

Non-Patent Document 8

The $23^{rd}$ image conference collected papers pp. 317-320 (1992)

DISCLOSURE OF THE INVENTION

The present invention is made in order to solve the above described problems of the conventional technologies. It is an object of the present invention to provide a method for fabricating a computer-generated hologram in which three-dimensional object data are recorded to allow reconstruction of a three-dimensional object having visualized cross-sectional surfaces, wherein the three-dimensional object composed only of surface data is cut along a given cross section and surface data are added to cross-sectional surfaces on the cross section so as to visualize the cross-sectional surfaces, and to provide such a computer-generated hologram itself.

It is another object of the present invention is to provide a method for fabricating a holographic stereogram which a three-dimensional object having visualized cross-sectional surfaces is reconstructably recorded and to provide such a holographic stereogram itself.

A fabrication method for a computer-generated hologram, in which a three-dimensional object having visualized cross-sectional surfaces is recorded, of the present invention capable of achieving the above described object is a fabrication method for a computer-generated hologram, in which a three-dimensional object having visualized cross-sectional surfaces, including: a step of obtaining a number of two-dimensional image data of a three-dimensional object; a step of producing three-dimensional image data composed only of surface data of the three-dimensional object from the two-dimensional image data obtained in the above step; a step of cutting the three-dimensional object composed only of the surface data produced in the above step along a predetermined cross section; a step of defining the shape of the three-dimensional object to be recorded in a hologram by adding surface data representing cross-sectional surfaces on the cut cross section to the same; a step of defining the arrangement of the three-dimensional object defined in the above step, a hologram plane, and a reference beam to compute interference fringes on the hologram plane; and a step of recording the interference fringes computed in the above step onto a recording medium.

In this case, the two-dimensional cross-sectional image data of the three-dimensional object are obtained by, for example, an X-ray CT, an MRI, or a TEM.

Another fabrication method for a computer-generated hologram, in which a three-dimensional object having visualized cross-sectional surfaces is recorded, of the present invention is a fabrication method for a computer-generated hologram, in which a three-dimensional object having visualized cross-sectional surfaces is recorded, including: a step of obtaining volume data of a three-dimensional object; a step of producing three-dimensional image data composed only of surface data of the three-dimensional object from the volume data obtained in the above step; a step of cutting the three-dimensional object composed only of the surface data produced in the above step along a predetermined cross section; a step of defining the shape of the three-dimensional object to be recorded in a hologram by adding surface data representing cross-sectional surfaces on the cut cross section to the same; a step of defining the arrangement of the three-dimensional object defined in the above step, a hologram plane, and a reference beam to compute interference fringes on the hologram plane; and a step of recording the interference fringes computed in the above step onto a recording medium.

In this case, the volume data of the three-dimensional object are obtained by, for example, an X-ray CT, an MRI, or a TEM.

The present invention includes a computer-generated hologram in which a three-dimensional object having visualized cross-sectional surfaces is recorded, wherein the computer-generated hologram is fabricated by the aforementioned fabrication method.

The present invention also includes a computer-generated hologram in which a three-dimensional object having visualized cross-sectional surfaces is recorded, wherein one or more computer-generated holograms, in which a three-dimensional object which is cut along a given cross section and of which cross-sectional surfaces on the cross section are visualized is reconstructably recorded, and a computer-generated hologram, in which the three-dimensional object before cut is reconstructably recorded, are multiplexed and recorded as a single computer-generated hologram.

In this case, the three-dimensional object is recorded such that three-dimensional objects to be reconstructed from the respective computer-generated holograms are multiplexed and recorded to have the same relative positions therebetween.

The present invention includes a printed matter with a computer-generated hologram attached at a predetermined position thereof, wherein the computer-generated hologram is fabricated by the aforementioned fabrication method.

A fabrication method for a holographic stereogram, in which a three-dimensional object having visualized cross-sectional surfaces is recorded, of the present invention is a fabrication method for a holographic stereogram, in which a three-dimensional object having visualized cross-sectional surfaces is recorded, including: a step of obtaining a number of two-dimensional image data of a three-dimensional object; a step of producing three-dimensional image data composed only of surface data of the three-dimensional object from the two-dimensional image data obtained in the above step; a step of cutting the three-dimensional object composed only of the surface data produced in the above step along a predetermined cross section; a step of defining the shape of the three-dimensional object to be recorded in a hologram by adding surface data representing cross-sectional surfaces on the cut cross section to the same; a step of producing a plurality of two-dimensional original images as observed in different observing directions from the three-dimensional object defined in the above step; and a step of recording element holograms relating to said two-dimensional original images to positions on a hologram plane corresponding to the observing directions, respectively, such that the two-dimensional original images are arranged in one-dimensional direction or in two-dimensional directions.

In this case, the two-dimensional image data of the three-dimensional object are obtained by, for example, an X-ray CT, an MRI, or a TEM.

Another fabrication method for a holographic stereogram, in which a three-dimensional object having visualized cross-sectional surfaces is recorded, of the present invention is a fabrication method for a holographic stereogram, in which a three-dimensional object having visualized cross-sectional surfaces is recorded, including: a step of obtaining volume data of a three-dimensional object; a step of producing three-dimensional image data composed only of surface data of the three-dimensional object from the volume data obtained in the above step; a step of cutting the three-dimensional object composed only of the surface data produced in the above step along a predetermined cross section; a step of defining the shape of the three-dimensional object to be recorded in a hologram by adding surface data representing cross-sectional surfaces on the cut cross section to the same; a step of producing a plurality of two-dimensional original images as observed in different observing directions from the three-dimensional object defined in the above step; and a step of recording element holograms relating to said two-dimensional original images to positions on a hologram plane corresponding to the observing directions, respectively, such that the two-dimensional original images are arranged in one-dimensional direction or in two-dimensional directions.

In this case, the volume data of the three-dimensional object are obtained by, for example, an X-ray CT, an MRI, or a TEM.

The present invention also includes a holographic stereogram in which a three-dimensional object having visualized cross-sectional surfaces is recorded, wherein the holographic stereogram is fabricated by the aforementioned fabrication method.

The present invention includes a printed matter with a holographic stereogram attached at a predetermined position thereof, wherein the holographic stereogram is fabricated by the aforementioned fabrication method.

BRIEF DESCRIPTION OF THE DRAWINGS

FIG. 1 is a flow chart showing a fabrication process for a computer-generated hologram of the present invention;

FIGS. 9(a) and 9(b) are schematic illustrations for explaining the way of multiplexing recording of the CGH;

FIG. 10 is a flow chart for explaining the outline of the fabrication process for the CGH;

FIG. 20 is a flow chart for explaining an example of the fabrication process for the holographic stereogram according to the multi-dot recording method of the present invention.

BEST MODES FOR CARRYING OUT THE INVENTION

Figure 2A:
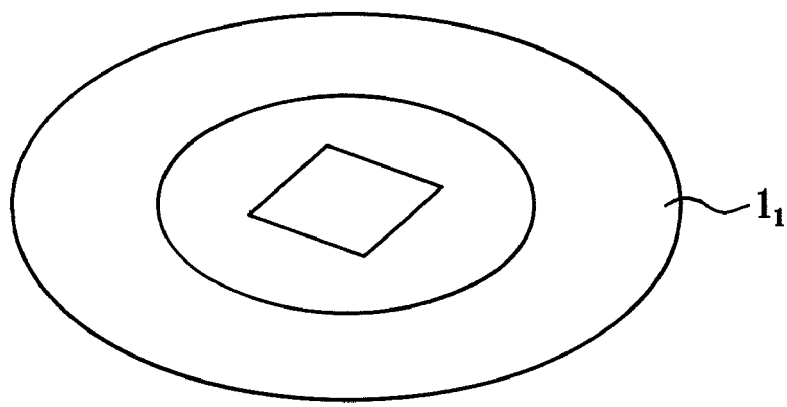
FIGS. 2(a)-2(c) are schematic illustrations for explaining a step for obtaining a plurality of two-dimensional image data of a three-dimensional object.

Hereinafter, a fabrication method for a computer-generated hologram, in which a three-dimensional object having visualized cross sections is recorded, of the present invention will be described. First, a number of two-dimensional cross-sectional image data of a target three-dimensional object to be measured are obtained by a measuring device such as an X-ray CT, an MRI, or a TEM. From the two-dimensional cross-sectional image data, a three-dimensional image composed only of surface data (polygon data) of the three-dimensional object is produced as CG (computer graphic) data. Further, cross-sectional surfaces of the obtained three-dimensional image when the three-dimensional image is cut along a given section (in this state, the section does not have surface data (polygon data)) are visualized by giving surface data (polygon data) to the cross-sectional surfaces, thereby fabricating CG data of the three-dimensional object having visualized cross-sectional surfaces. From the CG data of the three-dimensional object having visualized cross-sectional surfaces, a computer-generated hologram capable of reconstructing the three-dimensional object having the visualized cross-sectional surfaces is fabricated according to a well known CGH fabrication method (for example, see Non-patent document 2). This is the method of the present invention.

As an example of the CGH fabrication method, a case of a binary hologram in which intensity distribution of interference fringes is recorded and of which reconstructed image has only horizontal parallax and is observed from above with white light will be briefly described. As shown in FIG. 10, in a step ST1, the shape of an object to be recorded into a CGH is defined. Then, in a step ST2, the spatial arrangement of the object, a CGH surface, and a reference beam is defined. In a step ST3, the object is split vertically by the slicing in horizontal planes and is replaced by groups of point sources on the slice surfaces. Then in a step ST4, at each sampling point defined over the CGH surface, the intensity of interference fringes which are produced by the reference beam and a beam arriving from each of the point sources composing the object is computed based on the spatial arrangement, so as to get interference fringe data. The obtained interference fringe data are quantized in a step ST5 and are converted into EB lithography rectangular data in a step ST6. Then, in a step ST7, the EB lithography rectangular data are recorded in a medium by an EB lithography system, thereby obtaining a CGH.

During the calculation of the interference fringes, hidden surface removal process is performed. The hidden surface removal process is a process for making portions, which are hidden by the front object, invisible when the object is observed from a certain viewpoint. By the hidden surface removal process, the overlapping information of the objects is added to the retinal image, thus providing a stereoscopic effect. In the case of CGH recording, the hidden surface removal process is carried out by the following procedure.

Figure 11:
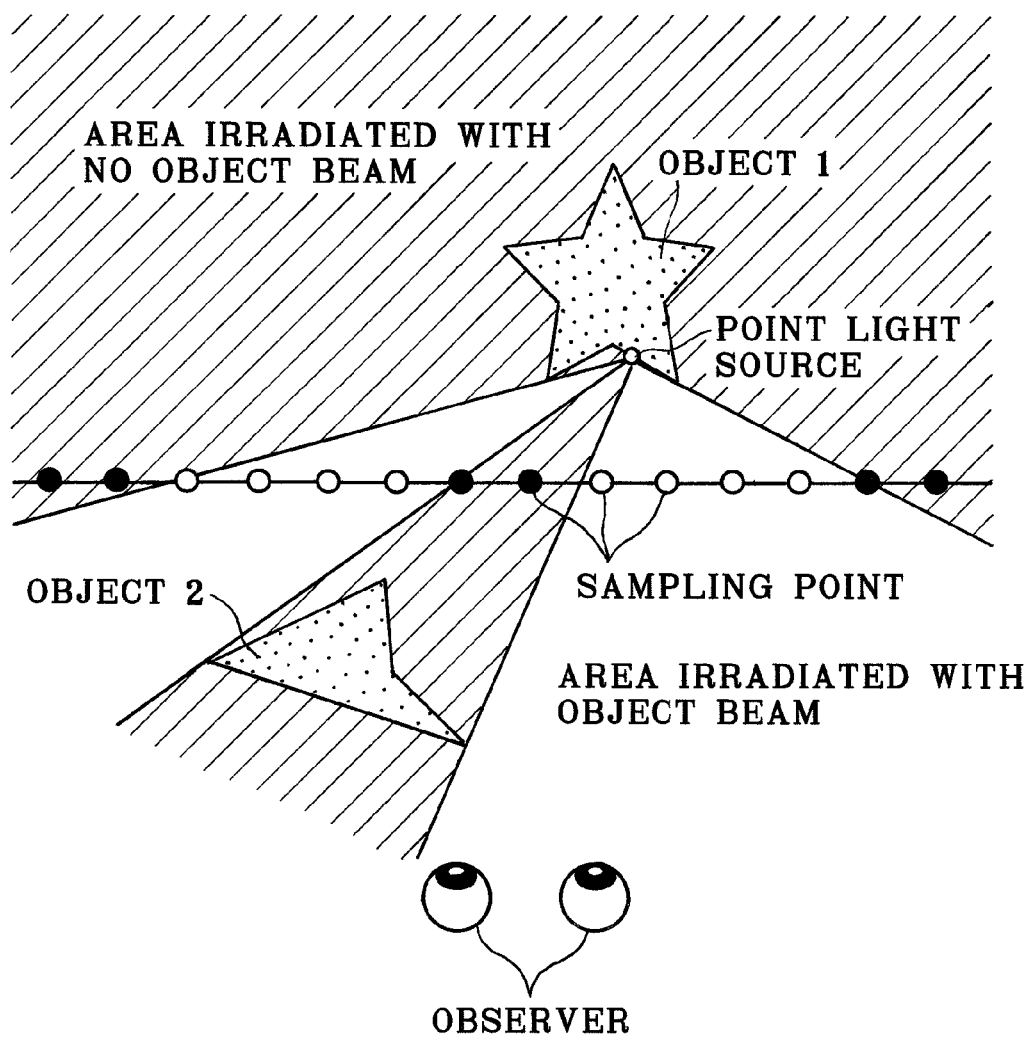
FIG. 11 is a schematic illustration for explaining the hidden surface removal process in the case of CGH recording.

As shown in FIG. 11, at each point light source composing the object 1, areas (hatched area of FIG. 11) where the point light sources are hidden by objects 1, 2 are computed. In the case of the CGH fabricated by the procedure of FIG. 10, the objects 1, 2 are sliced at the horizontal planes and have parallaxes only in the horizontal direction. Therefore, the areas of the object 1 where the point light sources thereof are hidden by the objects 1, 2 are computed from the positional relation between points and lines on each slice surface. In case where sampling points of the interference fringes distributed on the CGH surface are in the areas where the point light sources are hidden and which have been computed above (black circles of FIG. 11), the point light sources at the sampling points are excluded from the information for calculation of intensity of the interference fringes by the hidden surface removal process. From the reconstructed image of the object 1 of the CGH thus processed, reconstructing light is not diffracted on the hatched areas of FIG. 11. If the observer's viewpoint enters to the areas, the areas of object 1 corresponding to the point light sources are hidden by the image of object 2 and are thus invisible.

According to the fabrication method for the computer-generated hologram in which three-dimensional object having the visualized cross sections is recorded of the present invention, the shape of the object to be recorded in CGH as defined in the step ST1 of FIG. 10 is defined as follows. In the above case of the fabrication method for CGH, a three-dimensional image as CG data composed only of surface data (polygon data) is first fabricated from a plurality of two-dimensional sectional image data obtained by the measuring device such as a TEM. Then, the obtained three-dimensional image composed only of the surface data (polygon data) is cut along a given cross section. Since the cross section of the three-dimensional image is shown only by the outline portion thereof, a new surface (visualized cross section) is produced by newly adding surface data (polygon data) to the cross section of the three-dimensional image. Accordingly, the shape of the object to be recorded in CGH as defined in the step ST1 of FIG. 10 is defined as a shape of the object in which the new surface is added to the cross section of the three-dimensional image.

Figure 2B:
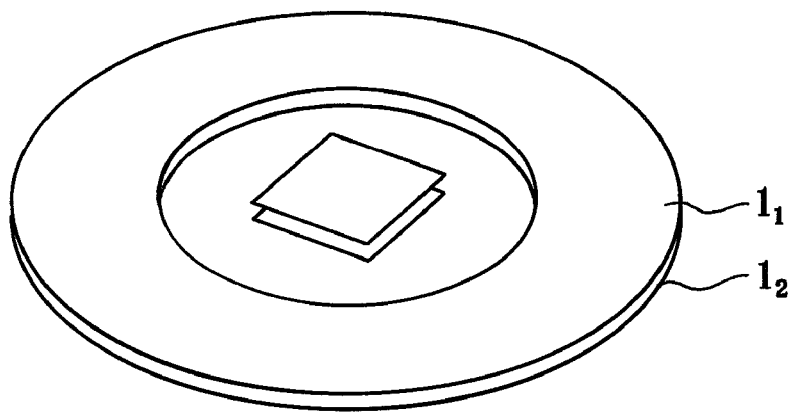
Figure 2C:
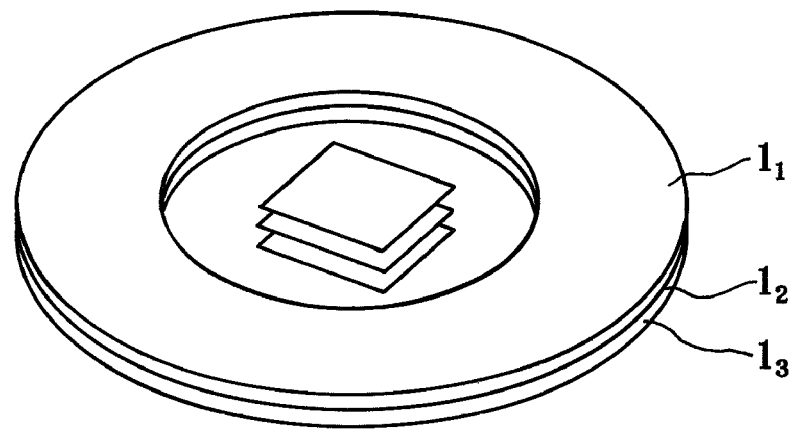

The aforementioned procedure for defining the shape data of the object to be recorded as a CGH will be described with reference to the drawings. First, in a step ST11 of FIG. 1, a number of two-dimensional cross-sectional image data of a target three-dimensional object are obtained by using a measuring device such as a TEM. As schematically illustrated, as shown in FIGS. 2(*a*)-2(*c*), two-dimensional image data $l_1, l_2, l_3, \ldots, l_n$ of which the positions (height) of the target three-dimensional object are different are obtained by the measuring device such as a TEM, an X-ray-CT, an MRI as mentioned above.

Figure 3:
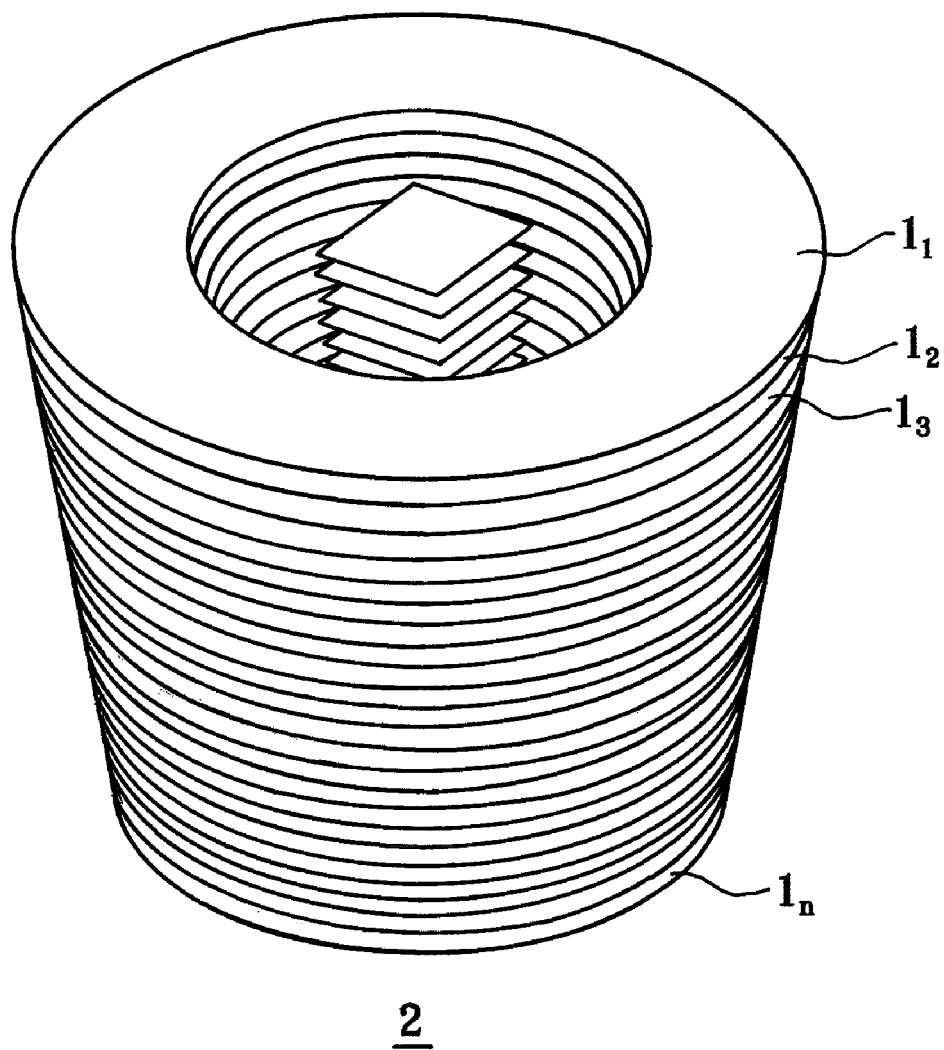
FIG. 3 is a schematic illustration for explaining a step for producing voxel data which represent the three-dimensional object.
Figure 4:
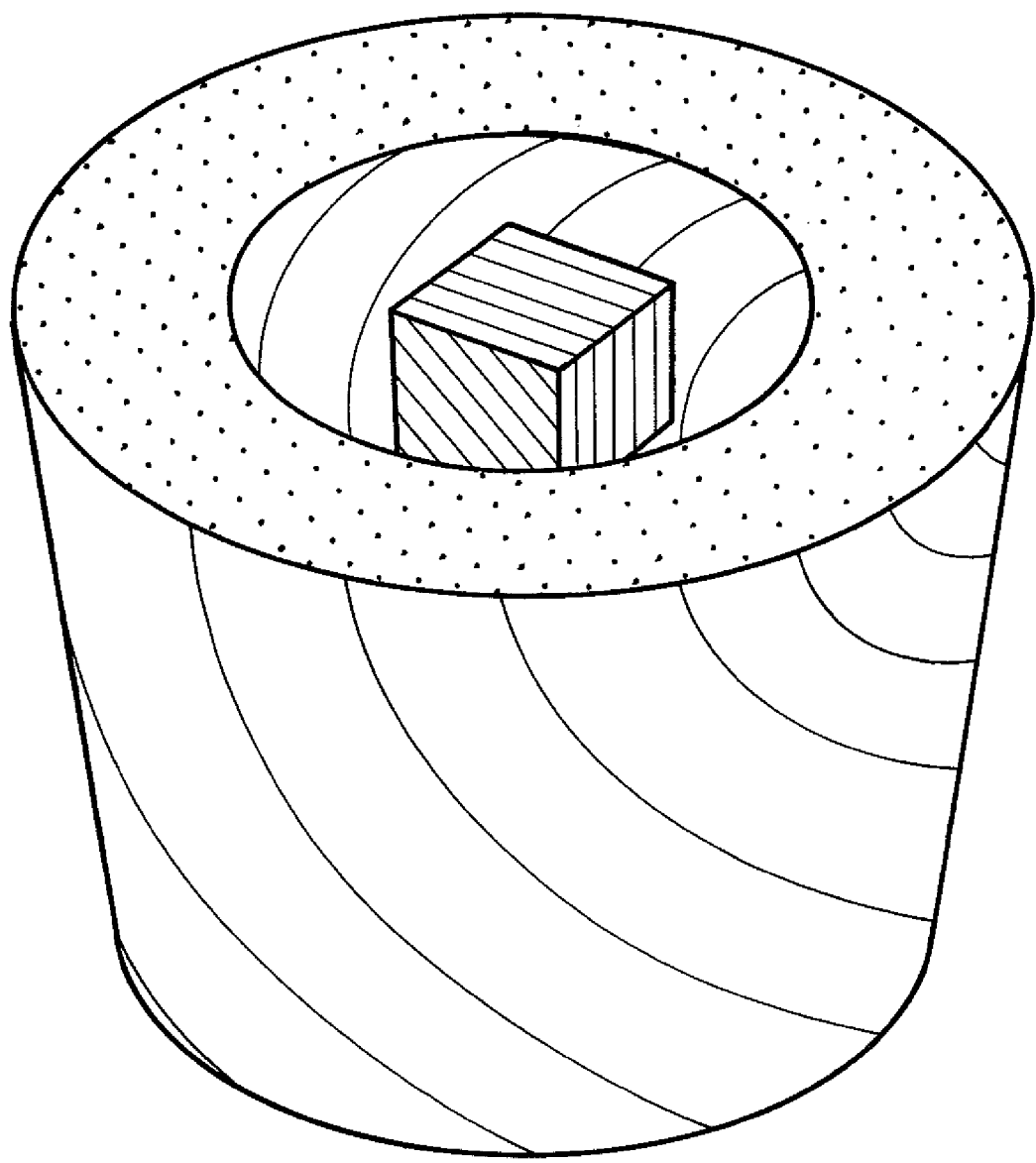
FIG. 4 is schematic illustration for explaining a step for producing polygon data which represent the shape of the three-dimensional object.

Then, in a step ST12 of FIG. 1, by piling up the obtained two-dimensional cross-sectional image data $l_1, l_2, l_3, \ldots, l_n$ in three-dimensional perspective depending on the cross section positions (height), voxel (volume) data 2 representing the target three-dimensional object are produced as shown in FIG. 3. After that, from the voxel data 2, polygon data (surface data) 3 representing the shape of the three-dimensional object are produced, as shown in FIG. 4.

Figure 5:
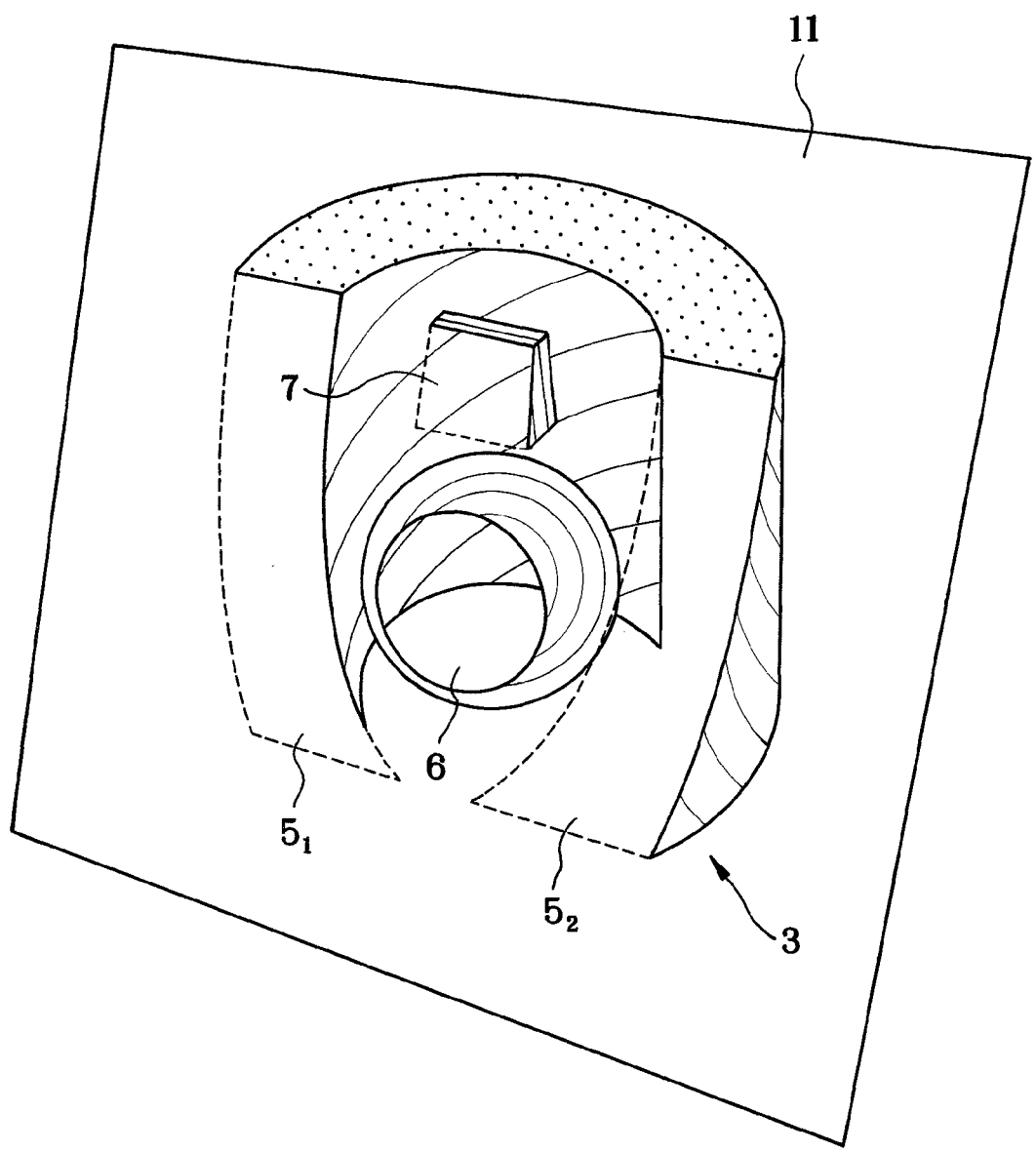
FIG. 5 is schematic illustration showing a state that the three-dimensional object, which is composed only of surface data, is cut along a given cross section.

In a step ST13 of FIG. 1, the produced three-dimensional object composed only of the surface data (polygon data) 3 is cut along a given cross section 11 as shown in FIG. 5. Since the surfaces of the three-dimensional object composed of polygon data are out of sight from the inside of the object, the three-dimensional object which is cut along the given section 11 is displayed as seen in FIG. 5. That is, outlines drawn in broken lines are not displayed. Further, the cross-sectional surface of the object is not displayed and the surface behind it appears when seeing the outside from the viewpoint inside the object via the cross-sectional surface and the surface of the object. For example, a left outline, a bottom outline, and a part of the inner surface of a left cross-sectional surface 51 in FIG. 5 are not displayed (are not seen) because it is assumed that these are seen from the inside of the object. A left outline and a bottom outline of a right cross-sectional surface 52 in FIG. 5 of the cylinder are not displayed (are not seen) because it is assumed that these are seen from the inside of the object. However, the inner surface (in part) of the cylinder on the background side is seen through the right cross-sectional surface 52 of the cylinder. Through a cross section 6 of a sphere inside the cylinder shown in FIG. 5, a rear face of the sphere at the background side is not seen and the inner surface (in part) of the cylinder is seen through. Besides, through a cross section 7 of a cuboid inside the cylinder shown in FIG. 5, a rear face of the cuboid at the background side is not seen and the inner surface (in part) of the cylinder is seen through. As mentioned above, as the three-dimensional object composed only of the polygon data 3 is cut along the given cross section 11, only parts of the outlines at the cross section are displayed, that is, not all of the outlines at the cross section is displayed. At the same time, surface images which are normally invisible are seen through the cross-sectional surfaces. It should be noted that the outline data which are shown by the broken lines on the cross section 11 for cutting the polygon data 3 are produced mathematically.

Figure 6:
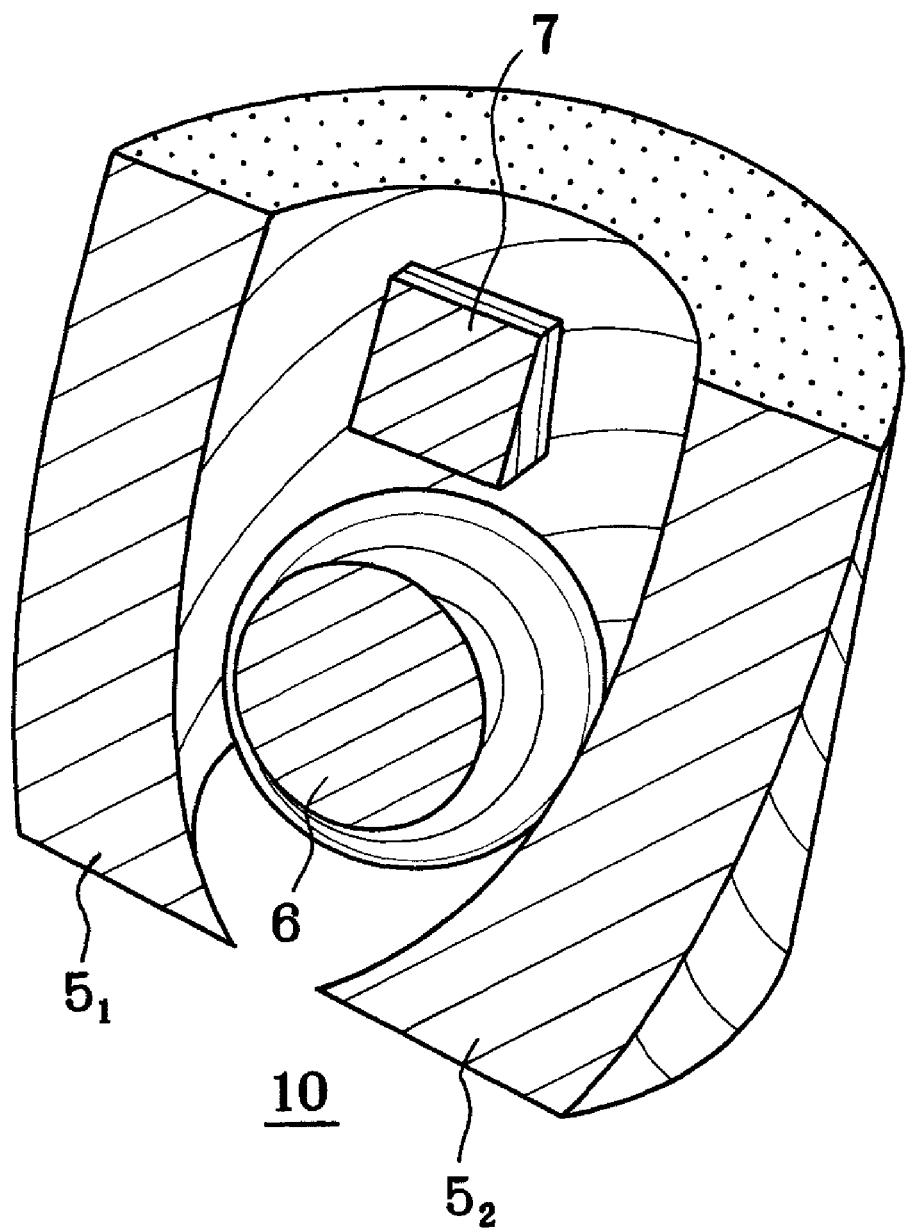
FIG. 6 is a schematic illustration for explaining a step for visualizing surfaces on the cross section by adding polygon data representing the surfaces on the cross section.

Then, in a step ST14 of FIG. 1, corresponding polygon data (surface data) are applied to the cross-sectional surfaces produced by cutting along the cross section 11, that is, the cross-sectional surface $5_1$, the cross-sectional surface $5_2$, and cross-sectional surfaces 6, 7 of FIG. 5, so that the new polygon data are added to the three-dimensional image cut along the cross-sectional surfaces $5_1$, $5_2$, 6, and 7, thereby defining the shape of the three-dimensional object 10 to be recorded into a CGH as shown in FIG. 6. Three-dimensional object 10 having the cross-sectional surfaces $5_1$, $5_2$, 6, and 7 treated with the polygon data is recorded as CG data of a natural three-dimensional image.

In this manner, the three-dimensional object having visualized cross-sectional surfaces defined in the step ST11 through the step ST14 is treated by the same processes as the steps ST2 to ST7 of FIG. 10, thereby obtaining a CGH in which the three-dimensional object having visualized cross-sectional surfaces. That is, in a step ST15, the spatial arrangement of the object, a CGH surface, and a reference beam is defined. In a step ST16, the three-dimensional object is split vertically by the slicing in horizontal planes and is replaced by groups of point sources on the slice surfaces. Then in a step ST17, at each sampling point defined over the CGH surface, the intensity of interference fringes, which are produced by arriving light from each of the point sources composing the object and the reference beam, is computed based on the spatial arrangement, so as to get interference fringe data. Next, the obtained interference fringe data are quantized in a step ST18 and are converted into EB lithography rectangular data in a step ST19. Then, in a step ST20, the EB lithography rectangular data are recorded in a medium by an EB lithography system, thereby obtaining a CGH.

By the way, from the X-ray-CT, the MRI, and the TEM, voxel (volume) data 2 for expressing the target three-dimensional object as shown in FIG. 3 can be obtained (Patent document 2, Non-patent document 3, Non-patent document 4). However, the data structure obtained in this case is not a laminated structure as shown in FIG. 3, and is composed of microcubes which are produced by sectioning the three-dimensional space into the microcubes and adding object data to each of the microcubes. From the voxel (volume) data 2, a CGH in which the three-dimensional object is reconstructably recorded can be fabricated by the same processes as the steps ST12 to ST20 of FIG. 1, CGH, wherein the three-dimensional object is cut along a given cross section and has cross-sectional surfaces on the cross section which are visualized. Hereinafter, the flow thereof will be briefly described.

Figure 7:
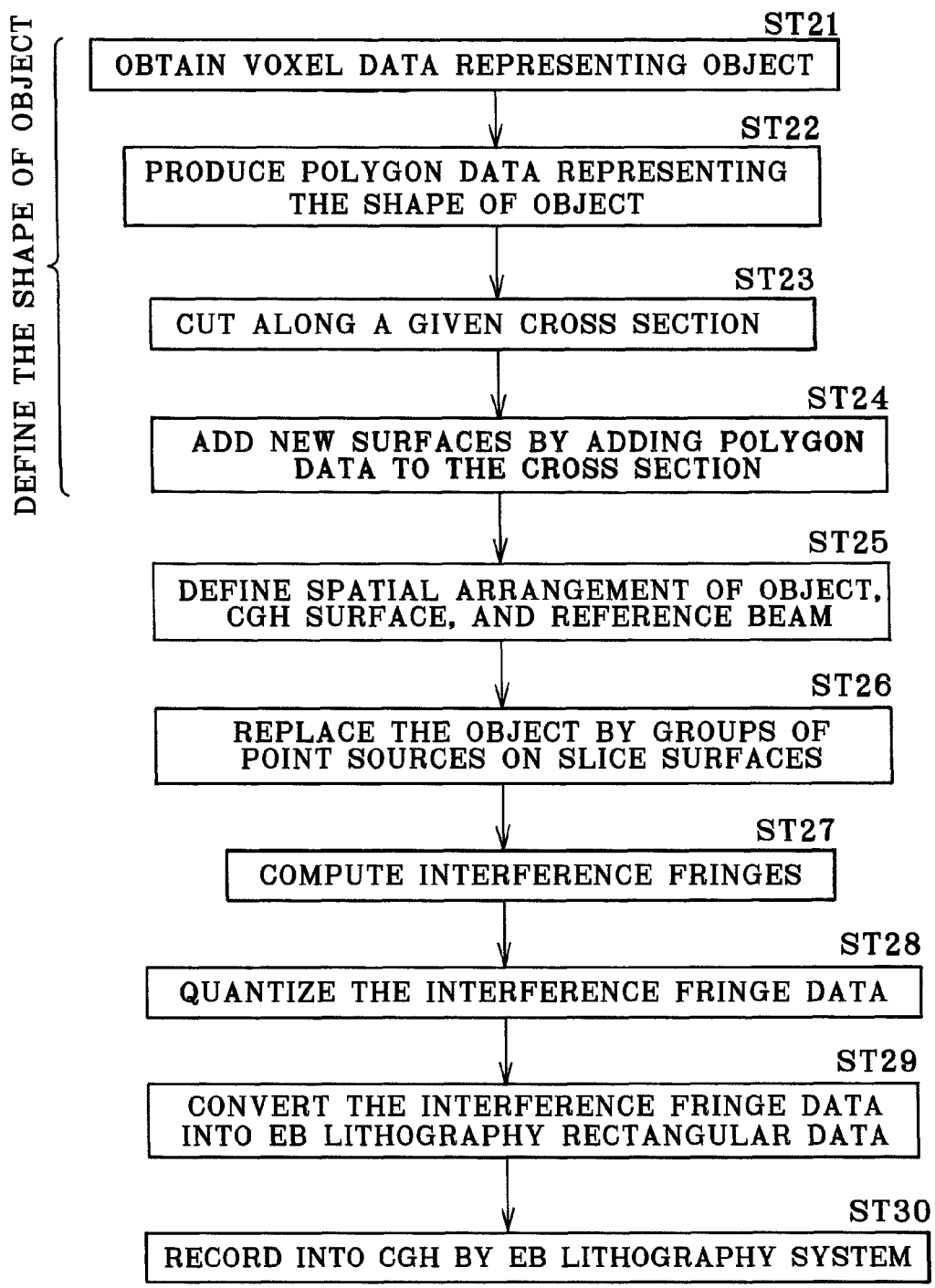
FIG. 7 is a flow chart showing another fabrication process for a computer-generated hologram of the present invention.

In a step ST21 of FIG. 7, voxel (volume) data 2 of the target three-dimensional object are obtained by using measuring device such as a three-dimensional X-ray-CT. In a step ST22, as shown in FIG. 4, polygon data (surface data) 3 which represent the shape of the three-dimensional object are produced from the obtained voxel (volume) data 2. In step ST23 of FIG. 7, as shown in FIG. 5, the three-dimensional object composed only of the produced surface data (polygon data) 3 is cut along a given cross section 11. Since the surfaces of the three-dimensional object composed of polygon data are out of sight from the inside of the object, the three-dimensional object which is cut along the given section 11 is displayed as seen in FIG. 5. That is, outlines drawn in broken lines are not displayed. Further, the cross-sectional surface of the object is not displayed and the surface behind it appears when seeing the outside from the viewpoint inside the object via the cross-sectional surface and the surface of the object. For example, a left outline, a bottom outline, and a part of the inner surface of a left cross-sectional surface $5_1$ in FIG. 5 are not displayed (are not sheen) because it is assumed that these are seen from the inside of the object. A left outline and a bottom outline of a right cross-sectional surface $5_2$ in FIG. 5 of the cylinder are not displayed (are not seen) because it is assumed that these are seen from the inside of the object. However, the inner surface (in part) of the cylinder on the background side is seen through the right cross-sectional surface $5_2$ of the cylinder. Through a cross section 6 of a sphere inside the cylinder shown in FIG. 5, a rear face of the sphere at the background side is not seen and the inner surface (in part) of the cylinder is seen through. Besides, through a cross section 7 of a cuboid inside the cylinder shown in FIG. 5, a rear face of the cuboid at the background side is not seen and the inner surface of the cylinder is seen through. As mentioned above, as the three-dimensional object composed only of the polygon data 3 is cut along the given cross section 11, only parts of the outlines at the cross section are displayed, that is, not all of the outlines at the cross section is displayed. At the same time, surface images which are normally invisible are seen through the cross-sectional surfaces. It should be noted that the outline data which are shown by the broken lines on the cross section 11 are produced mathematically.

Then, in a step ST24 of FIG. 7, corresponding polygon data (surface data) are applied to the cross-sectional surfaces produced by cutting along the cross section 11, that is, the cross-sectional surface $5_1$, the cross-sectional surface $5_2$, and cross-sectional surfaces 6, 7 of FIG. 5, so that the new polygon data are added to the three-dimensional image cut along the cross-sectional surfaces $5_1$, $5_2$, 6, and 7, thereby defining the shape of the three-dimensional object 10 to be recorded into a CGH as shown in FIG. 6. Three-dimensional object 10 having the cross-sectional surfaces $5_1$, $5_2$, 6, and 7 treated with the polygon data is recorded as CG data of a natural three-dimensional image.

In this manner, the three-dimensional object having visualized cross-sectional surfaces defined in the step ST21 to ST24 is treated to obtain a CGH in which the three-dimensional object having visualized cross-sectional surfaces. That is, in a step ST25, the spatial arrangement of the three-dimensional object, a CGH surface, and a reference beam is defined. In a step ST26, the three-dimensional object is split vertically by the slicing in horizontal planes and is replaced by groups of point sources on the slice surfaces. Then in a step ST27, at each sampling point defined over the CGH surface, the intensity of interference fringes, which are produced by arriving light from each of the point sources composing the object with the reference beam, is computed based on the spatial arrangement, so as to get interference fringe data. Next, the obtained interference fringe data are quantized in a step ST28 and are converted into EB lithography rectangular data in a step ST29. Then, in a step ST30, the EB lithography rectangular data are recorded in a medium by an EB lithography system, thereby obtaining a CGH.

In the CGH thus obtained, the three-dimensional object having the cross-sectional surfaces $5_1$, $5_2$, 6, and 7 as shown in FIG. 6 is reconstructably recorded.

Another CGH can be obtained in which the three-dimensional object is reconstructably recorded, wherein the three-dimensional object is the same, but is cut along a different given cross section and has cross-sectional surfaces on the cross section which are visualized.

Of course, still another CGH can be obtained in which the three-dimensional object is reconstructably recorded, wherein the three-dimensional object is original, that is, not cut as shown in FIG. 4.

Moreover, one or more CGHs are prepared in which the three-dimensional object is reconstructably recorded, wherein the three-dimensional object is cut along several cross sections and cross-sectional surfaces on the cross section are visualized. In addition, a CGH is also prepared in which the three-dimensional object is reconstructably recorded, wherein the three-dimensional object is original, that is, not cut. These CGHs are multiplexed (for example, see Patent document 1) and recorded in a single CGH, thereby fabricating the CGH which allows the whole shape of the three-dimensional object to be displayed and also allows the shape of the three-dimensional object which is cut at the given cross sections to be displayed by changing the viewpoint of the observer or the incident direction of reconstruction beam. The procedure will be described based on the method disclosed in Patent document 1.

Figure 8:
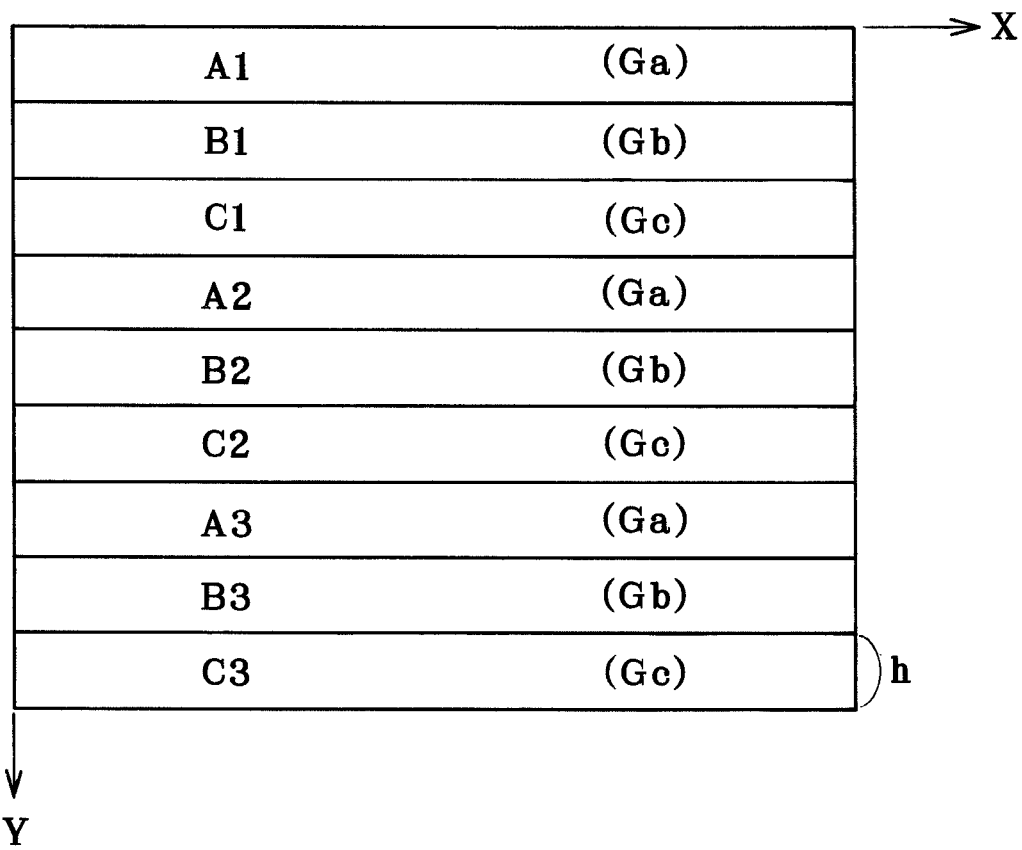
FIG. 8 is a schematic illustration showing an aspect of defining a plurality of recording areas on a recording surface of a CGH recording medium for multiplexing.

The original three-dimensional object not cut as shown in FIG. 4 is assumed as an object Fa, the three-dimensional object as shown in FIG. 6, in which the three-dimensional object is cut along a single cross section and the cross-sectional surfaces on the cross section are visualized, is assumed as an object Fb, and the three-dimensional object not shown, in which the same three-dimensional object cut along a different cross section and cross-sectional surfaces on the cross section are visualized, is assumed as an object Fc. By recording the three three-dimensional objects to be overlapped into a single medium, the three-dimensional object which is not cut and the three-dimensional objects which are cut along the different cross sections and have cross-sectional surfaces on the cross section which are visualized can be selectively reconstructed by changing the viewpoint location of the observer. Description will now be made as regard to this case. First, as shown in FIG. 8, a plurality of recording areas are defined on the recording surface of a recording medium 20. Here, assuming that the recording surface is on an XY plane, the respective recording areas are each defined as n rectangular area elongated in the direction of X axis. That is, in the example of FIG. 8, nine recording areas A1, B1, C1, A2, B2, C2, A3, B3, C3 are defined. All of the recording areas are identical rectangular areas which are elongated in the direction of X axis and have a width h in the direction of Y axis. In principle, a plurality of groups are defined corresponding to the number of three-dimensional objects to be recorded and the respective recording areas are affiliated to either group. In the example illustrated here, since the three three-dimensional objects are recorded to be overlapped, three different groups Ga, Gb, Gc are defined and the respective recording areas are affiliated to either of the three groups. In the example of FIG. 8, the recording areas A1, A2, A3 are affiliated to the group Ga, the recording areas B1, B2, B3 are affiliated to the group Gb, and the recording areas C1, C2, C3 are affiliated to the group Gc. In FIG. 8, the groups to which the respective recording area are affiliated are in parentheses.

As the respective recording areas are categorized into the groups, the information related to the specific three-dimensional object is recorded in recording areas affiliated to a specific group. For example, in case of recording the three three-dimensional objects Fa, Fb, and Fc, the three-dimensional object Fa is recorded in the recording areas A1, A2, and A3 affiliated to the group Ga, the three-dimensional object Fb is recorded in the recording areas B1, B2, and B3 affiliated to the group Gb, and the three-dimensional object Fc is recorded in the recording areas C1, C2, and C3 affiliated to the group Gc. In this case, the three-dimensional objects Fa, Fb, and Fc recorded in the recording areas of the respective groups are defined and recorded such that the three-dimensional objects Fa, Fb, Fc are placed at the same position relative to the recording surface of the recording medium 20 to have the same position relative to each other when reconstructed (the step ST15 of FIG. 1). The recording is conducted such that the incident direction of the reference beam to the recording surface of the recording medium 20 is set to be different from group to group. This recording method will be described specifically with reference to FIG. 9(a), 9(b).

First, as shown in FIG. 9(a), the first three-dimensional object Fa is recorded in the recording areas A1, A2, and A3 affiliated to the group Ga. During this, the reference beam Ra is irradiated from a first direction onto the recording surface so that interference fringes produced by the object beam Oa of the three-dimensional object Fa and the reference beam Ra are recorded in the respective recording areas A1, A2, and A3. As a matter of course, the record is a record of a CGH. In actuality, the interference fringes by the object beam Oa and the reference beam Ra are obtained by calculation (the step ST17 of FIG. 1) and the interference fringes are recorded by the EB lithography or the like. The same is true of the other recording areas B1, B2, B3, C1, C2, and C3.

Next, as shown in FIG. 9(b), the second three-dimensional object Fb is recorded in the recording areas B1, B2, and B3 which are affiliated to the group Gb. During this, the reference beam Rb is irradiated from a second direction onto the recording surface so that interference fringes produced by the object beam Ob of the three-dimensional object Fb and the reference beam Rb are recorded in the respective recording areas B1, B2, and B3.

In the last place, the third three-dimensional object Fc is recorded in the recording areas C1, C2, and C3 which are affiliated to the group Gc, but not shown. During this, the reference beam Rb is irradiated from a third direction onto the recording surface so that interference fringes produced by the object beam Oc of the three-dimensional object Fc and the reference beam Rc are recorded in the respective recording areas C1, C2, and C3.

In this manner, the recording of the interference fringes into the whole recording surface of the recording medium 20 is achieved. As a matter of course, in actuality, the interference fringes obtained by calculation are simultaneously recorded into the whole recording surface of the recording medium 20 by the EB lithography or the like.

During the recording in the recording areas of the respective groups, the reference beams Ra, Rb, and Rc are irradiated from the different incident directions to the recording surface.

As mentioned above, the three-dimensional objects are recorded with the respective reference beams in the different incident directions, whereby the different images of the three-dimensional objects Fa, Fb, and Fc are allowed to be selectively observed by changing the incident direction of the reconstruction beam with the viewpoint location of the observer and the orientation of the CGH being fixed, by changing the viewpoint location of the observer with the incident direction of the reconstruction beam and the orientation of the CGH being fixed, or by changing the orientation of the CGH with the viewpoint location of the observer and the incident direction of the reconstruction beam being fixed. According to the present invention, by changing the viewpoint, the incident direction of the reconstruction beam, or the orientation of the CGH, the whole shape of the three-dimensional object and the shape of the same when cut along the given cross section can be observed selectively.

Though three shapes of the identical three-dimensional object are recorded to be overlapped, two shapes or four or more shapes may be recorded to be overlapped.

By the way, the fabrication method for a CGH having visualized cross-sectional surfaces as defined in the steps ST11 to ST14 of FIG. 1 and The steps ST21 to ST24 of FIG. 7 and the fabrication method for a CGH to be recorded in the respective groups Ga, Gb, and Gc of FIG. 8 are not limited to fabrication method for a CGH which is a binary hologram in which intensity distribution of interference fringes are recorded as shown in the steps ST2 to ST7 of FIG. 10 and of which reconstructed image has only horizontal parallax and is observed by a white light from above. The methods may be adapted to various sorts of known CGHs. The other examples include a computer-synthesized hologram of Patent document 3. Hereinafter, the fabrication method for a computer-generated hologram will be described with reference to Patent document 3.

In accordance with the basic principle of the computer-generated hologram which is available for the fabrication method for a CGH of the present invention, in order to deprive the pixel structure on a hologram plane, a number of virtual point light sources having a radiance that varies according to the radiation direction and is equal to the radiance of an object surface in the corresponding direction or a number of virtual point light sources having a radiance that varies according to the condensing direction and is equal to the radiance of an object surface in the corresponding direction are defined at a position spaced away from the hologram plane so that a computer-generated hologram is fabricated by using light which radiates from the virtual point light sources or condense onto the virtual condensing points as virtual object beam, thereby obtaining a computer-generated hologram (CGH) having higher resolution and can dispense with any holographic photographing.

The principle of the computer-generated hologram thereof will now be described.

Figure 12:
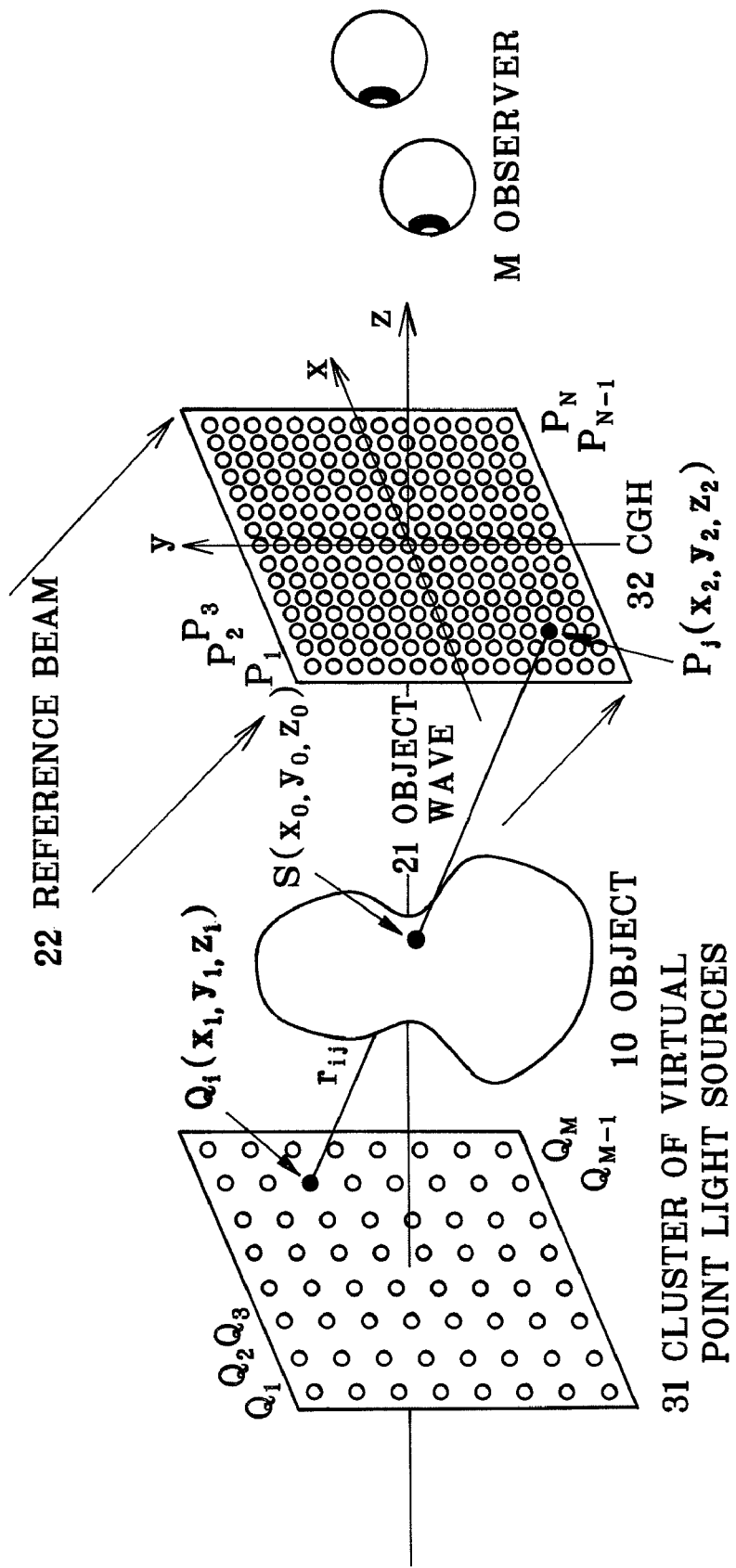
FIG. 12 is an illustration for explaining another principle for a computer-generated hologram which can be adapted as a CGH fabrication method in the present invention.

As shown in FIG. 12 illustrative of the principle of the invention, a cluster 31 of virtual point light sources, an object 10 (corresponding to the object 10 shown in FIG. 6 or the objects Fa, Fb, and Fc), a CGH 32, and an observer M are located in this order along a plus direction along a z-axis. With the center of the CGH 32 defining the origin of coordinates, x-axis and y-axis are determined in mutually orthogonal directions which are orthogonal to the z-axis.

Assuming that the coordinates of the virtual point light source cluster 31 are $(x_1, y_1, z_1)$, the coordinates of the object 10 are $(x_0, y_0, z_0)$, and the coordinates of the CGH 32 are $(x_2, y_2, z_2)$, the radiance of the object 10 in the $\theta_{xz}$, $\theta_{yz}$ directions at a point S $(x_0, y_0, z_0)$ where can be observed by the observer M among the points of intersection of the object 10 with a straight line $Q_iP_j$ connecting an i-th virtual point light source $Q_i$ ($x_1$, $y_1$, $z_1$) and a j-th cell $P_j$ ($x_2$, $y_2$, $z_2$) of the CGH 32 is represented by $T_{WLci}$ ($\theta_{xz}$, $\theta_{yz}$). Here, $\theta_{xz}$ is an angle of the straight light $Q_iP_j$ relative to the z-axis when projected onto an x-z plane, and $\theta_{yz}$ is an angle of the straight line $Q_iP_j$ relative to the z-axis when projected onto a y-z plane.

Assuming that a wavelength is $\lambda_c$, the amplitude of wavelength $\lambda_c$ of the virtual point light source $Q_i$ is $A_{WLci}$, the initial phase is $\phi_{WLci}$, and $r_{ij}$ is the distance between $Q_i$ and $P_j$, the complex amplitude value $O_{WLc}$ ($z_2$, $y_2$, $z_2$) of an object wave 21 at $P_j$ ($x_2$, $y_2$, $z_2$) becomes:

$$O_{WLc}(x_2, y_2, z_2) = \sum_{i=1}^{M} \left\{ \frac{A_{WLci} T_{WLci}(\theta_{xz}, \theta_{yz})}{|r_{ij}|} \right\} \times \exp\left[ j\left\{ \left(\frac{2\pi}{\lambda_c}\right) r_{ij} + \phi_{WLci} \right\} \right] \quad (1)$$

It should be noted that the amplitude $A_{WLci}$ may be all likewise set to 1.

Assuming that the incident vector of reference beam 22 consisting of parallel light incident on the CGH 32 is ($R_x$, $R_y$, $R_z$), the amplitude of the wavelength $\lambda_c$ thereof is $R_{WLc0}$, and the phase thereof at the origin of the coordinates is $\phi_{RWLc}$, the complex amplitude value $R_{WLc}$ ($x_2$, $y_2$, $z_2$) of the reference beam 22 becomes:

$$R_{WLc}(x_2,y_2,z_2)=R_{WLc0}\cdot\exp[j\{(2\pi/\lambda_c)\times(R_xx_2+R_yy_2+R_zz_2)/(R_x^2+R_y^2+R_z^2)^{1/2}+\phi_{RWLc}\}] \quad (2)$$

Te intensity value, $I_{WLc}$ ($x_2$, $y_2$, $z_2$), of interference fringes of object wave 21 and the reference beam 22 at $P_j$ ($x_2$, $y_2$, $z_2$) is:

$$I_{WLc}(x_2,y_2,z_2)=|O_{WLc}(x_2,y_2,z_2)+R_{WLc}(x_2,y_2,z_2)|^2 \quad (3)$$

In the above equations, the distance $r_{ij}$ between $Q_i$ and $P_j$ is:

$$r_{ij}=\{(x_2-x_1)^2+(y_2-y_1)^2+(z_2-z_1)^2\}^{1/2} \quad (4)$$

The angle $\theta_{xz}$ of the straight line $Q_iP_j$ relative to the Z-axis when projected onto the X-Z plane is:

$$\theta_{xz}=\tan^{-1}\{(x_2-x_1)/(z_2-z_1)\} \quad (5)$$

The angle $\theta_{yz}$ of the straight line $Q_iP_j$ relative to the Z-axis when projected onto the Y-Z plane is:

$$\theta_{yz}=\tan^{-1}\{(y_2-y_1)/(z_2-z_1)\} \quad (6)$$

The initial phases $\phi_{WLci}$ of the virtual point light sources $Q_i$ are mutually independently and constantly determined among virtual point light sources $Q_i$.

As can be seen from the above description, a number of virtual point light sources $Q_i$ ($x_1$, $y_1$, $z_1$) are set on a side opposite to the observing side of the three-dimensional object 10 which can be recorded and reconstructed as CHG 32. The luminance angle distribution $T_{WLci}$ ($\theta_{xz}$, $\theta_{yz}$) of divergent beams from the respective virtual point light sources $Q_i$ is set in such a way as to become equal to that on the surface of the three-dimensional object 10 as the virtual point light sources $Q_i$ are observed from the observing side through the three-dimensional object 10, and the initial phase $\phi_{WLci}$ of the virtual point light source $Q_i$ is mutually independently and constantly set among virtual point light sources $Q_i$. Divergent light beams from such virtual point light sources $Q_i$ are superimposed one upon another on the surface of the CGH 32, and the thus superposed phase and amplitude are holographically recorded (by interference with reference beam 22), thereby obtaining CGH 32 of the present invention which can reconstruct the three-dimensional object 10.

In the arrangement of FIG. 12, it is noted that the CGH 32 is not necessarily positioned on the observing side of object 10 and may be located anywhere on the observing side of the virtual point light source cluster 31. It is also noted that the object 10 is not necessarily positioned on the observing side of the virtual point light source cluster 31.

Figure 13:
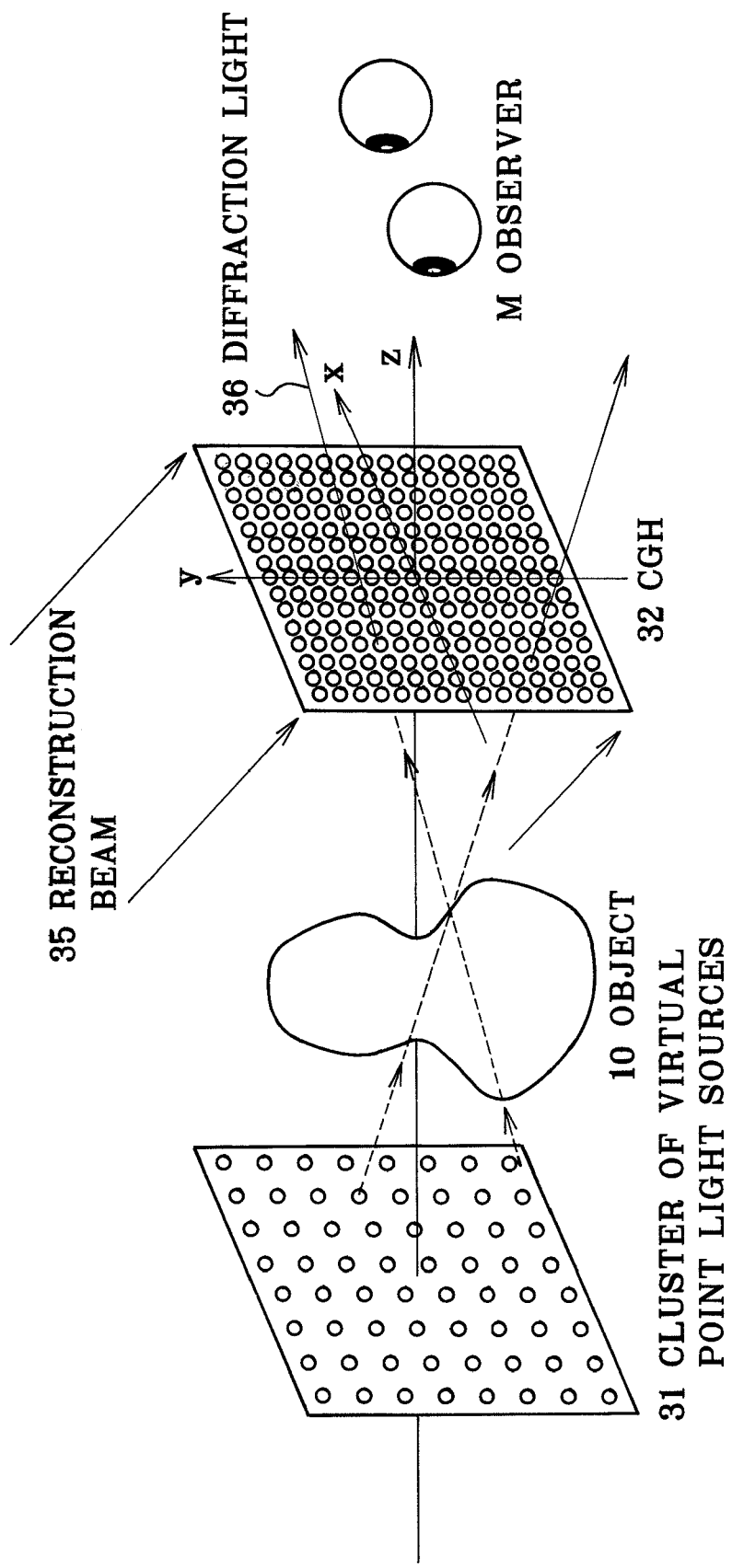
FIG. 13 is an illustration for explaining the aspect of stereoimage reconstruction from a computer-generated hologram according to the principle of FIG. 12.

As reconstruction beam 35 having the same wavelength $\lambda_c$ as that of the reference beam 22 is entered in the thus fabricated CGH 32 at the same angle of incidence as that of reference beam 22 as shown in FIG. 13, the object (three-dimensional object) 10 is reconstructed as a virtual image (often as a real image depending on the position of CGH 32 relative to object 10) by diffraction light 36 diffracted from CGH 32, enabling the observer M to observe the three-dimensional object 10. By movement of the viewpoint, the observer will be capable of observing the object 10 with satisfactory stereoscopic effects. It should be understood that although the diffraction light 36 propagates as leaving the virtual point light source cluster 31, the cluster 31 is yet hard to perceive directly because the light leaving each virtual point light source varies in luminance with directions.

Figure 14:
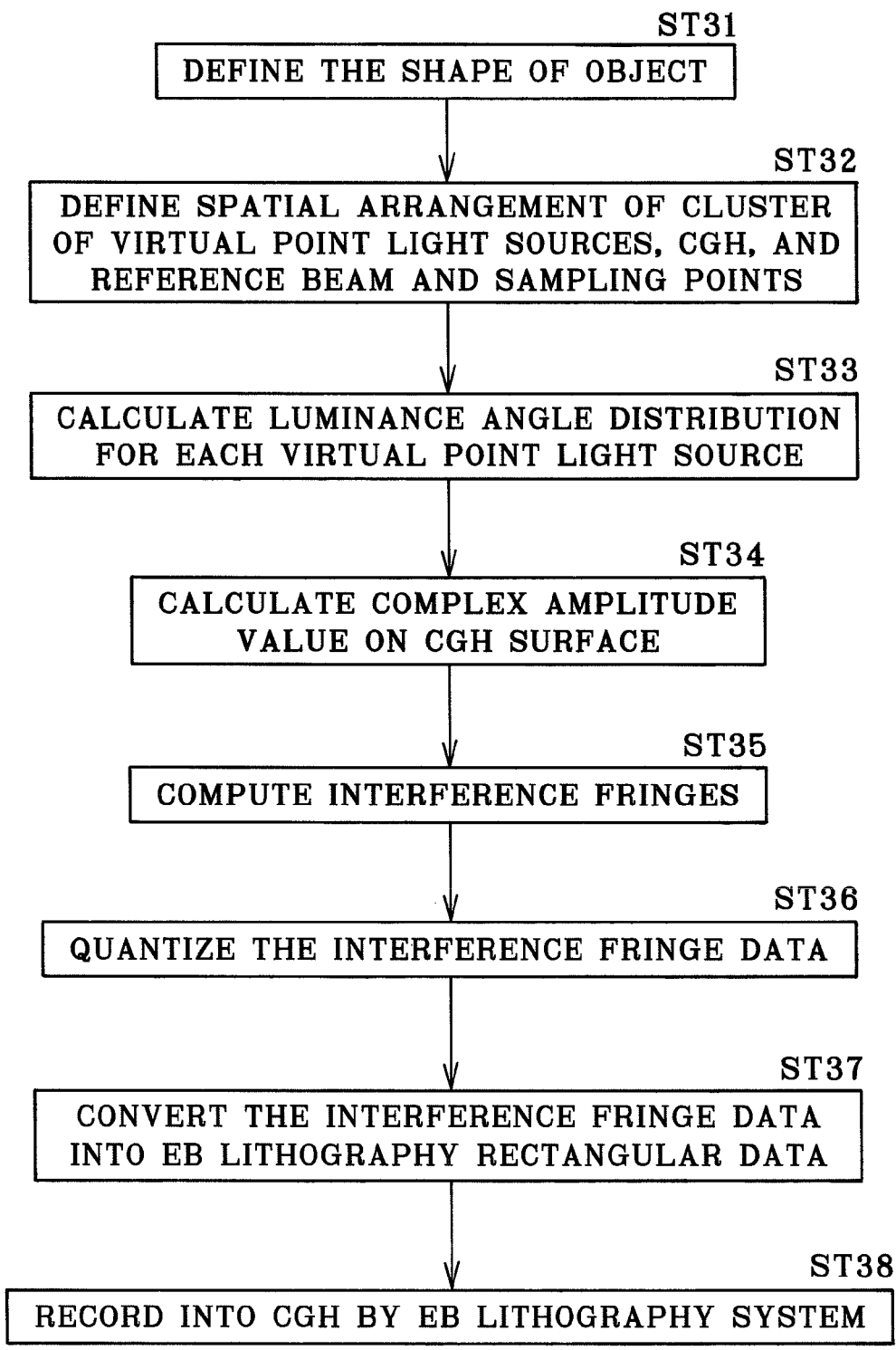
FIG. 14 is a flow chart for explaining the fabrication method for a computer-generated hologram according to the principle of FIG. 12.

A method of fabricating such a CGH 32 in the form of a binary hologram will now be explained with reference to FIG. 14. In a step ST31, the shape of an object 10 to be recorded into a CGH is defined. Then, in a step ST32, a spatial arrangement for a virtual point light source cluster 31, an object 10, a CGH 32 and a reference beam 22, a sampling point ($Q_i$) for virtual point light source cluster 31, and a sampling point ($P_j$) for the CGH 32 are defined. Then, in a step ST33, a luminance angle distribution $T_{WLci}$ ($\theta_{xz}$, $\theta_{yz}$) for each virtual point light source is set in such a way as to become equal to that on the surface of the object 10. Then, in a step ST34, the complex amplitude value $O_{WLc}$ ($x_2$, $y_2$, $z_2$) of object beam and the complex amplitude value $R_{WLc}$ ($x_2$, $y_2$, $z_2$) of the reference beam 22 on the surface of the CGH 32 are calculated from the equations (1) and (2). Thereafter, in a step ST35, the intensity of interference fringes by the object beam and the reference beam is computed from equation (3) at each sampling point defined on the surface of the CGH 32, thereby obtaining interference fringe data. After the obtained interference fringe data are quantized in a step ST36, the quantized interference fringe data are converted into EB lithographic rectangular data in a step ST37 and are recorded in a medium on an EB lithography system in a step ST 38, thereby obtaining the CGH 32.

Though, in FIG. 12, object waves from all virtual point light sources $Q_i$ are shown as being incident on the cell $P_j$ of the CGH 32, it is understood that the virtual point light source cluster 31 and the CGH 32 can be divided to a number of slice planes vertical to the y-axis such that the range of incidence of waves may be limited to within the slice planes.

Though, in FIG. 12, point light sources in a two-dimensional plane are employed as the virtual point light sources, line light sources which extend in the direction of y-axis and of which light does not scatter in the direction of y-axis (the light scatters in the direction of x-axis) may be employed as the virtual point light sources.

In the example of FIG. 12, the method of using the interference of object beam and reference beam is employed to fix the complex amplitude value $O_{WLc}$ ($x_2$, $y_2$, $z_2$) of the object beam as a hologram. Instead of this, Lohmann's method and Lee's method (Non-patent document 5) in which the complex amplitudes of object waves are directly reconstructed may be employed, and the method proposed in Patent document 4 may be employed.

Figure 15:
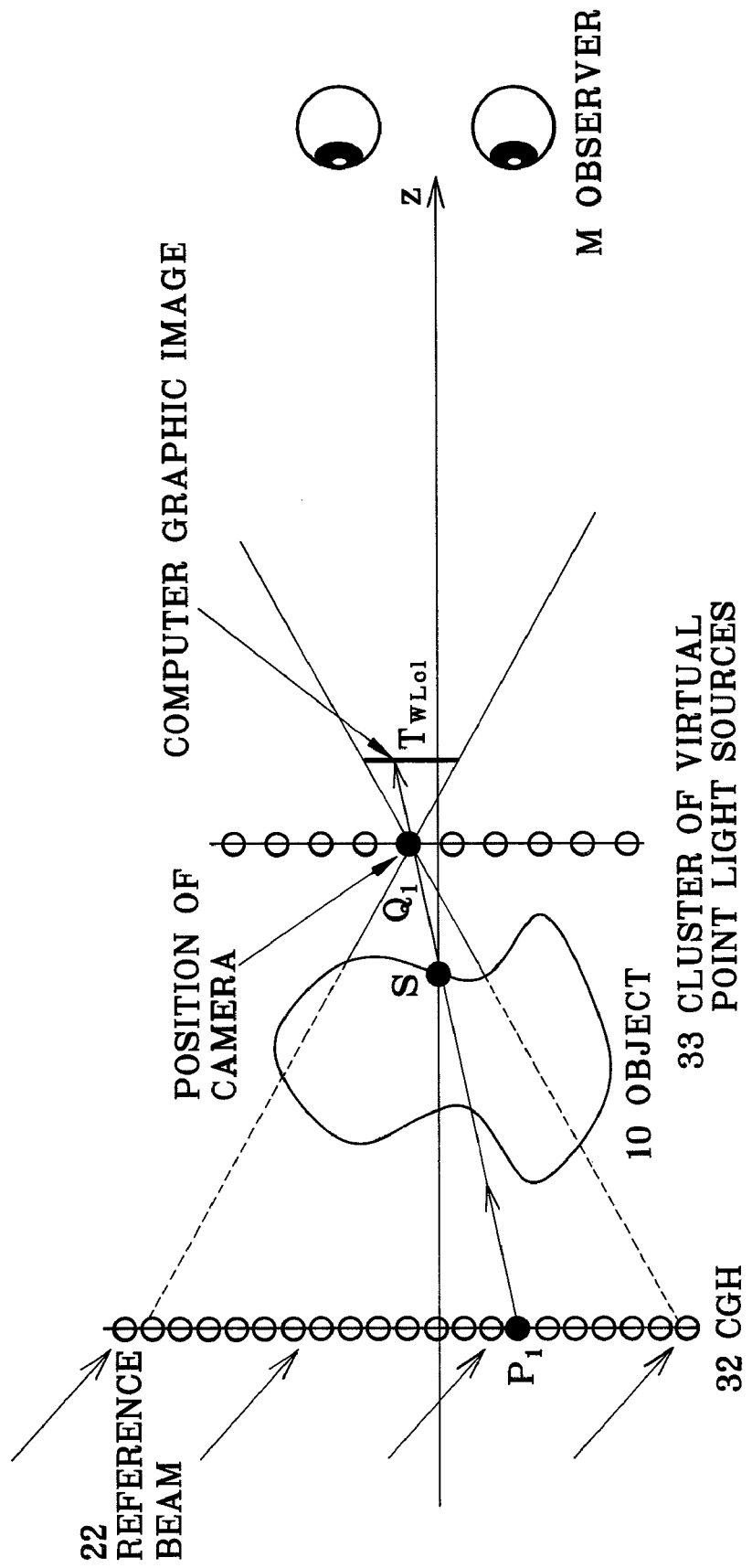
FIG. 15 is an illustration for explaining a computer-generated hologram of another form which is adapted as a CGH fabrication method in the present invention.

FIG. 15 shows another embodiment of the computer-generated hologram which is available as the fabrication method of CGH according to the invention. In this embodiment, the virtual point light source cluster 31 and CGH 32 of FIG. 12 are interchanged and the virtual point light source cluster 31 is replaced by a virtual condensing point cluster 33. As shown in FIG. 15, a CGH 32, an object 10, a virtual condensing point cluster 33 and an observer M are located in this order in a plus direction along a z-axis. With the center of the CGH 32 defining the origin of coordinates, x-axis and y-axis are determined in mutually orthogonal directions which are orthogonal to the z-axis. Assuming that the coordinates of the virtual point light source cluster 33 are $(x_1, y_1, z_1)$, the coordinates of object 10 are $(x_0, y_0, z_0)$ and the coordinates of CGH 32 are $(x_2, y_2, z_2)$, the radiance of object 10 in $\theta_{xz}$ and $\theta_{yz}$ directions at a point S $(x_0, y_0, z_0)$ which can be observed by the observer M among the points of intersection of object 10 with a straight line $Q_iP_j$ connecting an ith virtual condensing point $Q_i$ $(x_1, y_1, z_1)$ with a j-th cell $P_j$ $(x_2, y_2, z_2)$ of CGH 32 is represented by $T_{WLci}$ $(\theta_{xz}, \theta_{yz})$. Here, $\theta_{xz}$ is an angle of straight light $Q_iP_j$ relative to the z-axis when projected onto an x-z plane, and $\theta_{yz}$ is an angle of straight line $Q_iP_j$ relative to the z-axis when projected onto a y-z plane.

Assuming that a wavelength is $\lambda_c$, the phase of wavelength $\lambda_c$ of the virtual point light source $Q_i$ is $\phi_{WLci}$, and $r_{ij}$ is the distance between $Q_i$ and $P_j$, the complex amplitude value $O_{WLc}$ $(x_2, y_2, z_2)$ of an object wave at $P_j$ $(x_2, y_2, z_2)$ becomes, instead of the aforementioned formula (1):

$$O_{WL_c}(x_2, y_2, z_2) = \sum_{i=1}^{M} \left\{ \frac{T_{WL_{ci}}(\theta_{xz}, \theta_{yz})}{|r_{ij}|} \right\} \times \exp\left[j\left\{-\left(\frac{2\pi}{\lambda_c}\right)|r_{ij}| + \phi_{WL_{ci}}\right\}\right] \quad (1')$$

Assuming that the incident vector of reference beam 22 consisting of parallel light incident on the CGH 32 is $(R_x, R_y, R_z)$, the amplitude of the wavelength $\lambda_c$ thereof is $R_{WLc0}$, and the phase thereof at the origin of the coordinates is $\phi_{RWLc}$, the complex amplitude value $R_{WLc}$ $(x_2, y_2, z_2)$ of the reference beam 22 becomes, similarly to the case of FIG. 12:

$$R_{WLc}(x_2,y_2,z_2) = R_{WLc0} \cdot \exp[j\{(2\pi/\lambda_c) \times (R_x x_2 + R_y y_2 + R_z z_2)/(R_x^2 + R_y^2 + R_z^2)^{1/2} + \phi_{RWLc}\}] \quad (2)$$

The intensity value of the interference fringes $I_{WLc}$ $(x_2, y_2, z_2)$ by the object beam and the reference beam 22 on $P_j$ $(x_2, y_2, z_2)$ is, similarly, $$I_{WLc}(x_2,y_2,z_2) = |O_{WLc}(x_2,y_2,z_2) + R_{WLc}(x_2,y_2,z_2)|^2 \quad (3)$$

In the above equations, the distance $r_{ij}$ between $Q_i$ and $P_j$ is:

$$r_{ij} = \{(x_2-x_1)^2 + (y_2-y_1)^2 + (z_2-z_1)^2\}^{1/2} \quad (4)$$

The angle $\theta_{xz}$ of the straight line $Q_iP_j$ relative to the Z-axis when projected onto the X-Z plane is:

$$\theta_{xz} = \tan^{-1}\{(x_2-x_1)/(z_2-z_1)\} \quad (5)$$

The angle $\theta_{yz}$ of the straight line $Q_iP_j$ relative to the Z-axis when projected onto the Y-Z plane is:

$$\theta_{yz} = \tan^{-1}\{(y_2-y_1)/(z_2-z_1)\} \quad (6)$$

The initial phases $\phi_{WLci}$ of the virtual point light sources $Q_i$ are mutually independently and constantly determined among virtual point light sources $Q_i$.

As can be seen from the above description, a number of virtual point light sources $Q_i$ $(x_1, y_1, z_1)$ are set on a side opposite to the observing side of the three-dimensional object 10 which can be recorded and reconstructed as CHG 32. The luminance angle distribution $T_{WLci}$ $(\theta_{xz}, \theta_{yz})$ of divergent beams from the respective virtual point light sources $Q_i$ is set in such a way as to become equal to that on the surface of the three-dimensional object 10 as the virtual point light sources $Q_i$ are observed from the observing side through the three-dimensional object 10, and the initial phase $\phi_{WLci}$ of the virtual point light source $Q_i$ is mutually independently and constantly set among virtual point light sources $Q_i$. Convergent light beams on such virtual condensing points $Q_i$ are superimposed one upon another on the surface of CGH 32, and the thus superposed phase and amplitude are holographically recorded (by interference with reference beam 22), thereby obtaining CGH 32 of the present invention which can reconstruct the three-dimensional object 10.

In the arrangement of FIG. 15, it should be noted that the CGH 32 is not necessarily located on the side opposite to the observing side of the object 10 and may be located anywhere on the side opposite to the observing side of the virtual condensing point cluster 33. It is also noted that the object 10 is not necessarily positioned on the side opposite to the observing side of the virtual condensing point cluster 33.

It is noted the luminance angle distribution $T_{WLci}$ $(\theta_{xz}, \theta_{yz})$ of convergent light from the object side on the above virtual condensing point Qi is the same as that for a computer graphic image generated with a computer graphic camera located at the position of virtual condensing point Qi, as shown in FIG. 15, and so the calculation of the equation (1') can be simplified because usable to this end is a computer graphic image (3D CG image) generated using commercial software with the viewpoint placed on the virtual condensing point $Q_i$.

Figure 16:
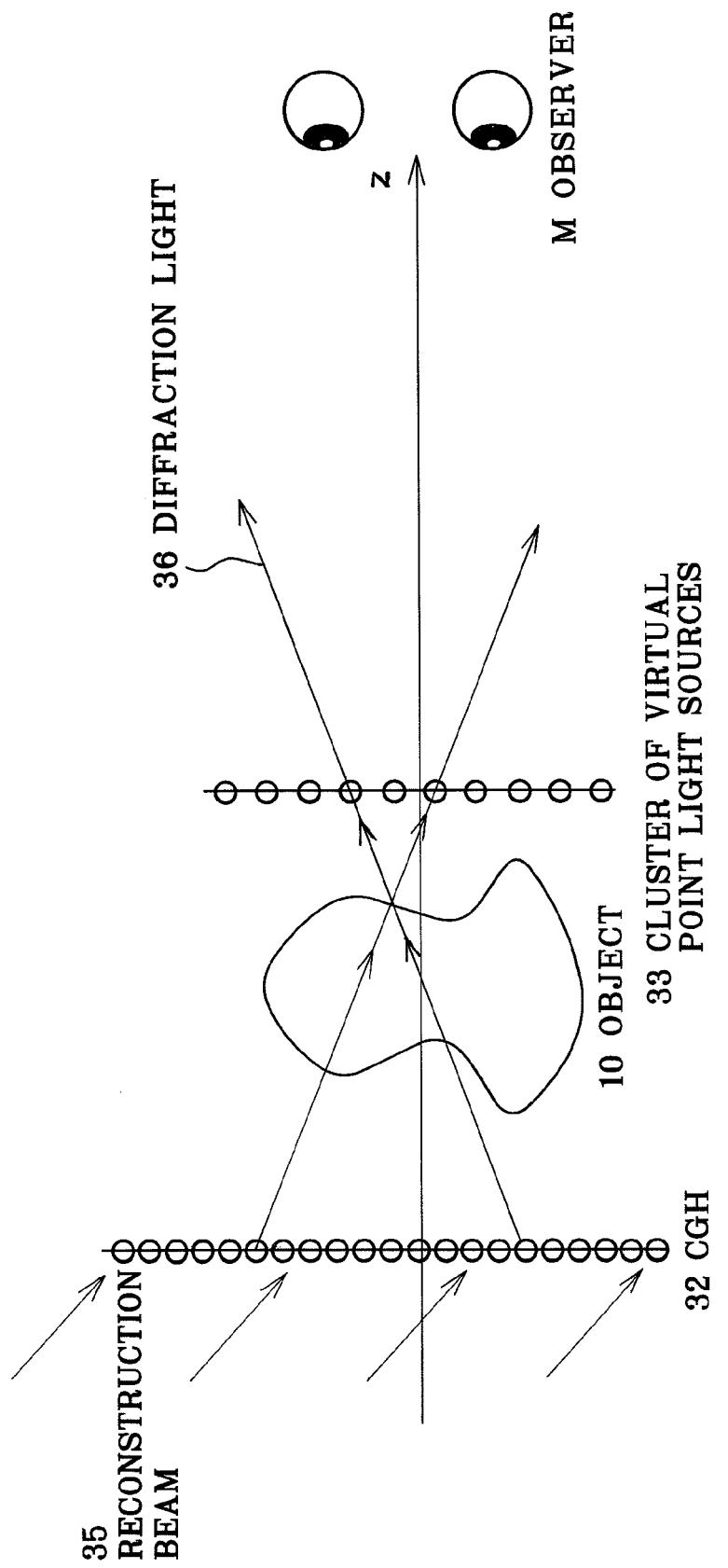
FIG. 16 is an illustration for explaining the aspect of stereoimage reconstruction from a computer-generated hologram according to the principle of FIG. 15.

As reconstruction beam 35 having the same wavelength $\lambda_c$ as that of the reference beam 22 is entered in the thus fabricated CGH 32 at the same angle of incidence as that of the reference beam 22 as shown in FIG. 16, the object (three-dimensional object) 10 is reconstructed as a real image (often as a virtual image depending on the position of the CGH 32 relative to the object 10) by diffraction light 36 diffracted from the CGH 32, enabling the observer M to observe the three-dimensional object 10. By movement of the viewpoint, the observer will be capable of observing the object 10 with satisfactory three-dimensional effects. It should be understood that although the diffraction light 36 propagates as leaving the virtual point light source cluster 33, the cluster 33 is yet hard to perceive directly because the light leaving each virtual point light source varies in luminance with directions.

Figure 17:
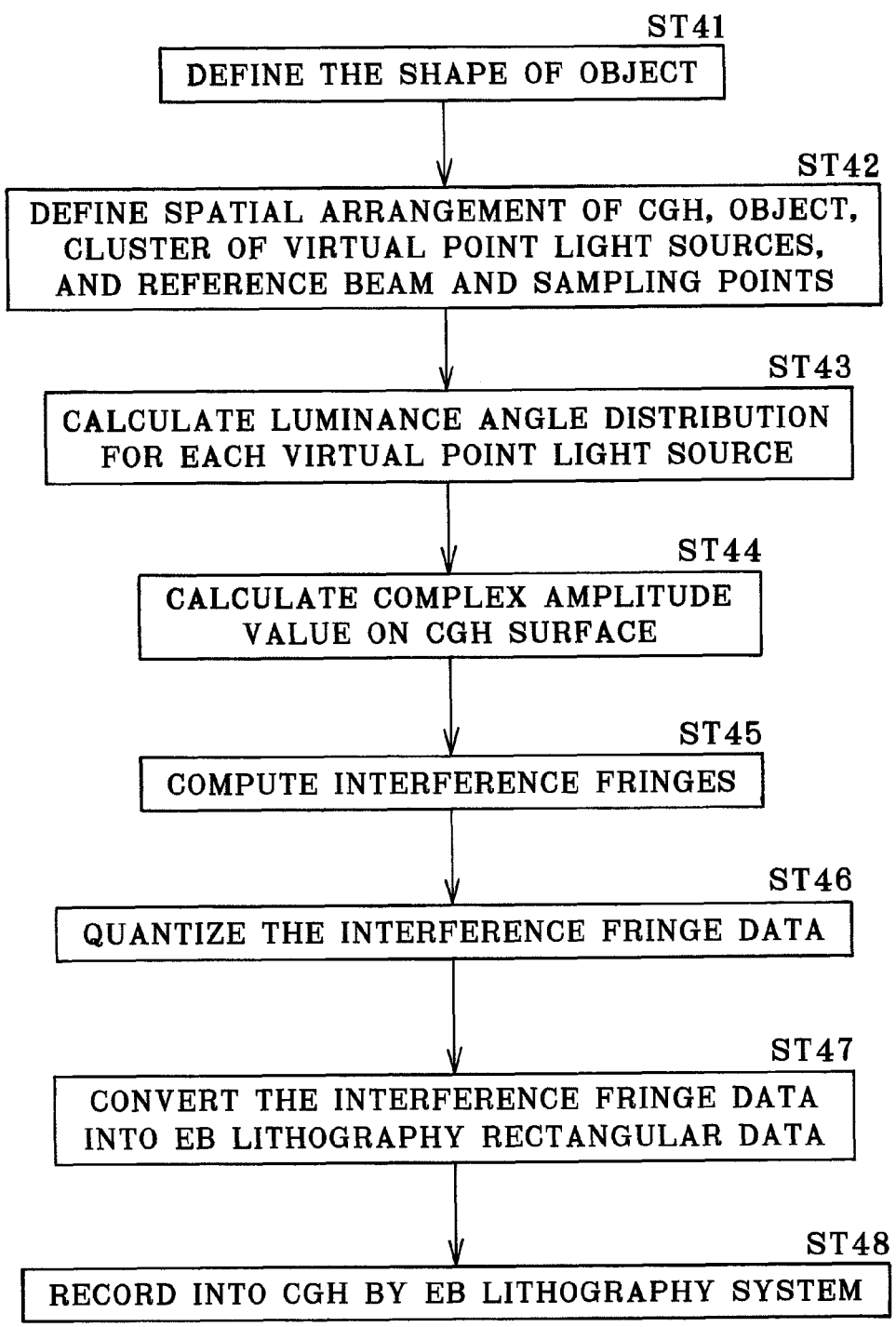
FIG. 17 is a flow chart for explaining the fabrication method for a computer-generated hologram according to the principle of FIG. 15.

A method of fabricating such a CGH 32 as explained with reference to FIGS. 15 and 16 in the form of a binary hologram will now be explained with reference to FIG. 17. FIG. 17 is essentially similar to FIG. 14, except that in a step ST42, a spatial arrangement of a CGH 32, an object 10, a virtual condensing point cluster 33 and a reference beam 22, a sampling point $(P_j)$ for the CGH 32 and a sampling point $(Q_i)$ for the virtual condensing point cluster 33 are defined, that in a step ST43, a luminance angle distribution $T_{WLci}$ $(\theta_{xz}, \theta_{yz})$ for each virtual point light source is set in such a way as to become equal to that on the surface of the object 10, and that in a step ST44, the complex amplitude value $O_{WLc}$ $(x_2, y_2, z_2)$ of the object beam and the complex amplitude value $R_{WLc}$ $(x_2, y_2, z_2)$ of the reference beam 22 on the surface of the CGH 32 are calculated from the equations (1') and (2). Therefore, other description will be omitted.

Also in this embodiment, object waves incident on all virtual condensing points $Q_i$ are shown as being incident on the cell $P_j$ of the CGH 32, it is understood that the virtual condensing point cluster 33 and the CGH 32 may be divided to a number of slice planes vertical to the y-axis in such a way that the range of incidence of waves may be limited to within the slice planes.

Though, in FIG. 15, point light sources in a two-dimensional plane are employed as the virtual point light sources, line light sources which extend in the direction of y-axis and of which light does not scatter in the direction of y-axis (the light scatters in the direction of x-axis) may be employed as the virtual point light sources.

In the example of FIG. 15, the method of using the interference of object beam and reference beam is employed to fix the complex amplitude value $O_{WLc}$ ($x_2$, $y_2$, $z_2$) of the object beam as a hologram. Instead of this, Lohmann's method and Lee's method (Non-patent document 5) in which the complex amplitudes of object waves are directly reconstructed may be employed, and the method proposed in Patent document 4 may be employed.

According to the present invention, the data of the object 10 as shown in FIG. 6 and the data of the objects Fa, Fb, and Fc are used as the data of the three-dimensional object 10 to be recorded in the CGH 32 fabricated by the aforementioned method.

The present invention includes fabrication method for the holographic stereogram in which three-dimensional objects having visualized cross-sectional surfaces is recorded and also includes the holographic stereogram thereof. In the fabrication method for a holographic stereogram of the present invention, similarly to the fabrication method for a computer-generated hologram of the present invention mentioned above in which three-dimensional object having visualized cross-sectional surfaces is recorded, a number of two-dimensional cross-sectional image data of the three-dimensional object are obtained by a measuring device such as an X-ray-CT, an MRI or a TEM, a three-dimensional image composed only of the surface data (polygon data) thereof is produced as CG (computer graphic) data from the obtained two-dimensional cross-sectional image data, and surface data (polygon data) are added to cross-sectional surfaces on a cross section along which the obtained three-dimensional object is cut (the object just after cutting has no surface data (no polygon data)) so as to visualize the cross-sectional surfaces, thereby obtaining CG data of a three-dimensional object having visualized cross-sectional surfaces. By using the CG data of the three-dimensional object having visualized cross-sectional surfaces, that is, the CG data of the three-dimensional object having visualized cross-sectional surface defined in the steps ST11 to ST14 of FIG. 1 or the CG data of the three-dimensional object having visualized cross-sectional surfaces defined in the steps ST21 to ST24 of FIG. 7, a holographic stereogram is fabricated.

There are two main types of holographic stereogram which have been developed. From the number of times of photographing steps, they are called as a 2 step holographic stereogram and a 1 step holographic stereogram.

The 2 step holographic stereogram is fabricated by two times of photographing steps as its name indicates. The detail of this fabrication method is described in Patent document 5. The following is a brief description of the method. The method comprises the following three processes: (1) preparing two-dimensional images of a target object taken from a plurality of positions distant from the object, (2) dividing a first sensitive material into a plurality of areas and holographically recording corresponding images among the imaged prepared in process (1) to the respective areas so as to fabricate a first hologram, and (3) irradiating the reconstruction beam to the first hologram to reconstruct the images and recording thus reconstructed images to a second sensitive material so as to fabricate a second hologram. On the other hand, the 1 step holographic stereogram is fabricated by one time of photographing step as its name indicates. The detail of the fabrication method is described in Patent document 6, Patent document 7, Non-patent document 6, Non-patent document 7, and Non-patent document 8. The following is a brief description of the method. The method comprises the following two processes: (1) obtaining beams to be irradiated from a number of positions on a sensitive material, and (2) dividing the sensitive material into a plurality of areas and holographically recording beams to be reconstructed from the areas to the corresponding areas obtained in process (1).

Either the 2 step holographic stereogram or the 1 step holographic stereogram enables stereoscopic viewing and is thus used as a general-purpose reconstructing medium of stereoimage.

Hereinafter, description will be made as regard to an example in which CG data of the three-dimensional object having visualized cross-sectional surfaces defined in the steps ST11 to ST14 of FIG. 1 or CG data of the three-dimensional object having visualized cross-sectional surfaces defined in the steps ST21 to ST24 of FIG. 7 are used as an object to be recorded in a multi-dot holographic stereogram (hereinafter, referred to as "multi-dot HS" for simplicity) as described in Non-patent document 6, Non-patent document 7, and Non-patent document 8.

Figure 18:
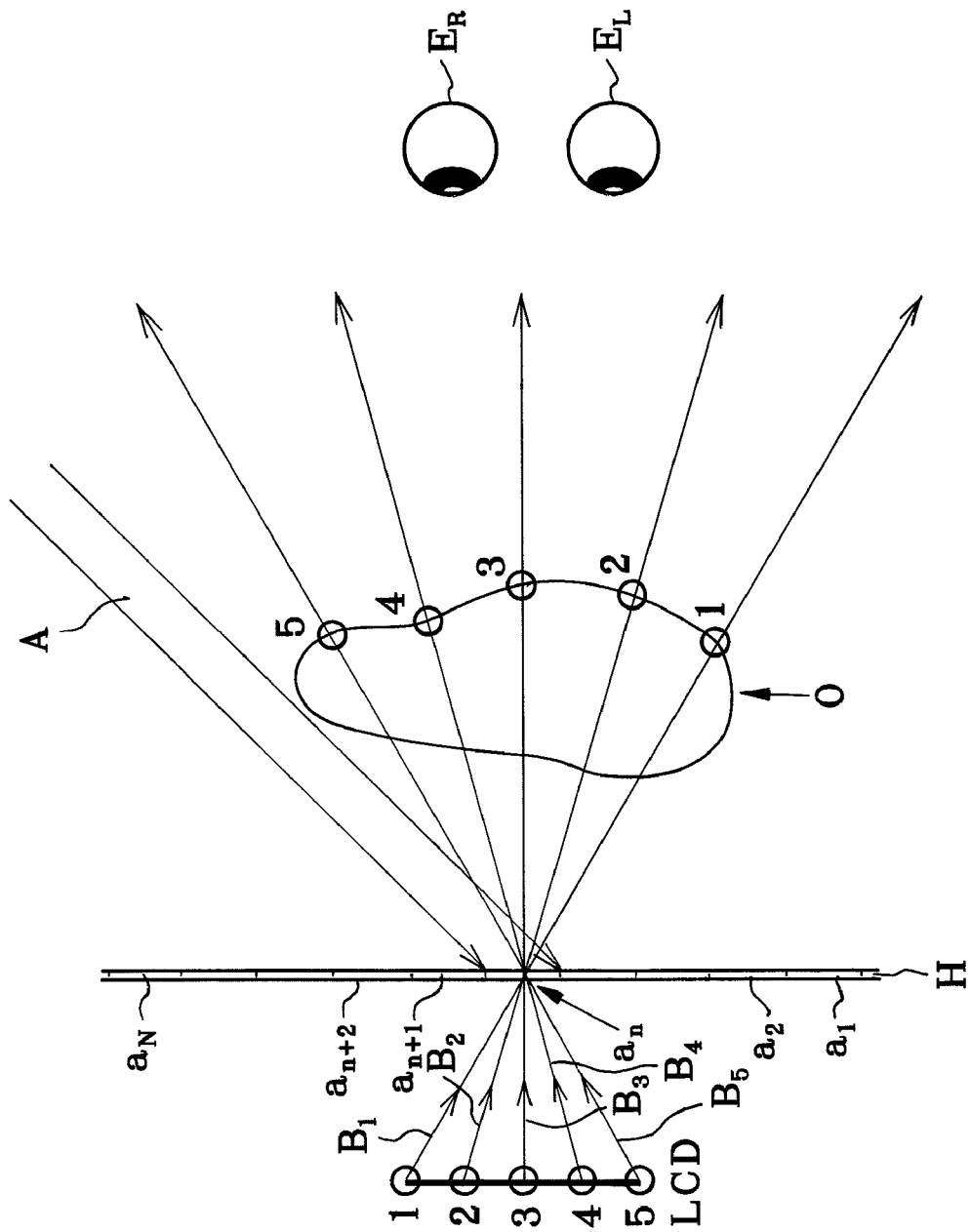
FIG. 18 is an illustration showing the principle of a holographic stereogram according to a multi-dot recording method which is adapted to the fabrication method for a holographic stereogram of the present invention.

The fabrication method for a multi-dot HS will be briefly described with reference to FIG. 18 illustrating its principle. A three-dimensional object to be displayed is defined as O (corresponding to the object 10 of FIG. 6), and a volume hologram which reconstructs the three-dimensional object O is defined as H. A volume hologram sensitive material in the step photographing the hologram H is also denoted by H. The volume hologram H is composed of minute element holograms $a_1$ through $a_N$ which are arranged in a line. The relative location of the three-dimensional object O and the hologram H is considered as being fixed.

The beams which pass through the center of a certain element hologram $a_n$ and have different angles relative to the plane of the hologram is defined as $B_1$ through $B_5$ and the positions where the beams $B_1$ through $B_5$ intersect with the surface of the three-dimensional object are defined as 1-5. When the element hologram an is recorded in such a manner that the beams $B_1$ through $B_5$ having different angles diffracted from the element hologram $a_n$ have the information of the positions on the surface of three-dimensional object 1-5, respectively, and the observer sees the element hologram $a_n$ with his or her left and right eyes $E_L$, $E_R$, the surface information of the three-dimensional object O at the positions where respective lines connecting the eyes $E_L$, $E_R$ and the element hologram an intersect with the surface of the three-dimensional object O is incident on the left and right eyes $E_L$, $E_R$.

When the other element hologram $a_m$ is recorded in the same way, the observer perceives the stereoimage O as the three-dimensional image on the principle of binocular parallax. This is because, even if the observer observes any portion of the hologram H with his or her left and right eyes $E_L$, $E_R$, the surface information of the three-dimensional object O at the positions where respective lines connecting the portion and the left and right eyes $E_L$, $E_R$ intersect with the surface of the three-dimensional object O are incident on the left and right eyes $E_L$, $E_R$. By aligning the element holograms $a_1$ through $a_N$ in one-dimensional direction, the holographic stereogram in which the three-dimensional image can be reconstructed by the binocular parallax only in horizontal direction is obtained. On the other hand, by aligning the element holograms $a_1$ through $a_N$ in two-dimensional directions, the holographic stereogram in which the three-dimensional image can be reconstructed by the binocular parallax in any direction is obtained. This is the principle of the multi-dot HS.

To record the element hologram $a_n$, the beams $B_1$ through $B_5$ are extended to the opposite side of the observer, information at the positions 1-5 of the surface of the three-dimensional object O is displayed on a display surface of a display (for example, a liquid crystal display) LCD at intersections 1-5 where the extended beams $B_1$ through $B_5$ intersect with the display surface, and the beams $B_1$ through $B_5$ modulated by passing through the displaying positions 1 to 5 and the reference beam A of the given angle are interfered with each other at the position of the element hologram an of the volume hologram sensitive material H, In this manner, the multi-dot HS is obtained. The foregoing information displayed on the positions 1-5 of the display surface of the display LCD is synthesized from the CG data of the three-dimensional object having visualized cross-sectional surfaces defined in the steps ST11 to ST14 of FIG. 1 or synthesized from the CG data of the three-dimensional object having visualized cross-sectional surfaces defined in the steps ST21 to ST24 of FIG. 7.

As mentioned above, as the multi-dot HS is reconstructed, the beams from the respective points on the hologram H can be reconstructed correctly so that the stereoimage of the recorded three-dimensional object O can be observed. This means that, with the areas of the element holograms $a_1$ through $a_N$ of the hologram H being used as windows, the direction and the intensity of each of all beams from the three-dimensional object O to be observed are correctly recorded and correctly reconstructed through the windows. Therefore, it is possible to reconstruct the stereoimage without any distortion.

Now, an example of the fabrication method for the multi-dot HS of the present invention will be described with reference to Non-patent document 7 with FIG. 19 and FIG. 20.

Figure 19:
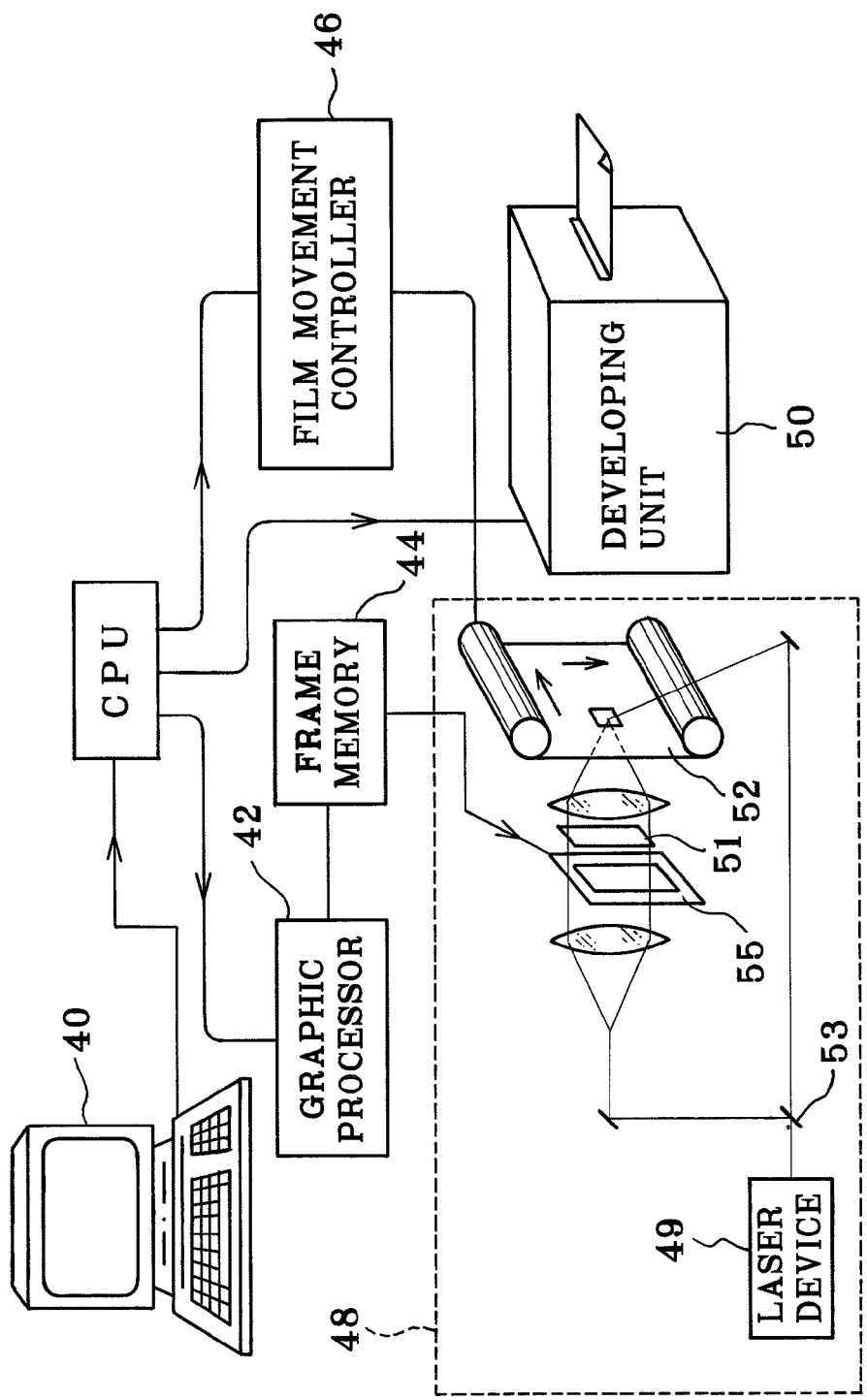
FIG. 19 is a schematic view showing an example of the fabrication system for a holographic stereogram according to the multi-dot recording method of the present invention.

FIG. 19 is a schematic view showing an example of the fabrication system for the multi-dot HS of the present invention and FIG. 20 is a flow chart for explaining the fabrication process for the multi-dot HS of the present invention. An operator observes the three-dimensional object on a monitor of a computer 40 from a variety of different angles and sets the output direction.

First, in a step ST51 of FIG. 20, three-dimensional image data are entered to the host computer 40. In the present invention, the three-dimensional image data are CG data of a three-dimensional object having visualized cross-sectional surfaces defined in the steps ST11 to ST14 of FIG. 1 or CG data of a three-dimensional object having visualized cross-sectional surfaces defined in the steps ST21 to ST24 of FIG. 7.

Then, in a step ST52, a hologram dry plate 52 is moved by a film movement controller 46 to set the hologram dry plate 52 at a desired position.

In a step ST53, original image patterns to be exposed on respective points of a hologram from the original three-dimensional data are calculated by a graphic processor 42 according to the principle of FIG. 18 and are stored in a frame memory 44.

In a step ST54, the original image patterns are displayed on a liquid crystal panel 55.

Then, in a step ST55, a shutter of an optical system 48 is opened to expose the liquid crystal panel 55. The laser beam taken from a laser device 49 is split to an object beam and a reference beam by a beam splitter 53. The object beam is amplitude-modulated by the image patterns of the liquid crystal panel 55 and is phase-modulated by a pseudorandom diffuser 51. The thus modulated object beam is condensed on a hologram plane 52 to cooperate together with the reference beam to produce a single element hologram.

In a step ST56, the hologram dry plate 52 is moved by the film movement controller 46 sequentially so as to conduct the exposure over the whole hologram plane 52 in a step ST57.

After that, in a step ST58, image development of the hologram 52 is conducted by a developing unit 50 so as to automatically produce a multi-dot HS.

It should be noted that the graphic processor 42, the film transferring controller 46, and the developing unit 50 are controlled by a CPU.

In this example, the original image corresponding to a coordinate position of the condensing point on the hologram plane 52, that is, the two-dimensional image of the three-dimensional object having visualized cross-sectional surfaces defined in the steps ST11 to ST14 of FIG. 1 or the two-dimensional image of the three-dimensional having visualized cross-sectional surfaces defined in the step ST21 to ST24 of FIG. 7, to be observed through a window that is the coordinate position of the condensing point on the hologram plane 52, is produced as original image data. The original image data is displayed on the liquid crystal panel 55 as a display means. A dot-like element hologram corresponding to the original image is formed on the hologram plane 52 by using the optical system 48. The sequential movement and display of the coordinate position of the condensing point on the hologram plane 52 and formation of an element hologram are repeated, thereby forming a plurality of dot-like element holograms to the hologram plane 52. In this manner, element holograms are formed with adding the phase modulation to the object beam condensed on the hologram plane 52 by the pseudorandom diffuser 51.

By the way, among holographic stereograms, there is a type (Non-patent document 8) in which images of the three-dimensional object which are projected in a plurality of directions are used, in stead of the two-dimensional images of the three-dimensional object to be observed through the respective areas of the element holograms $a_1$ to $a_N$ as windows as in the case of FIG. 18, as original images to be recorded in the element holograms $a_1$ to $a_N$. In the holographic stereogram of this type, from the CG data of the three-dimensional object having visualized cross-sectional surfaces defined in the steps ST11 to ST14 of FIG. 1 or the CG data of the three-dimensional object having visualized cross-sectional surfaces defined in the steps ST21 to ST24 of FIG. 7 which are the original three-dimensional data, original image patterns to be exposed on the respective hologram areas of the hologram are computed, as images projected in the corresponding directions, by the graphic processor 42 in the step ST53 of FIG. 20. Thus computed original image patterns are stored in the frame memory 44. Also in this case, as known from Non-patent document 5 and the like, the holographic stereogram may be fabricated as a two-step holographic stereogram. That is, the reconstruction beam is irradiated on the first hologram obtained in the step ST58 to reconstruct the image, the reconstructed image is recorded in a second hologram dry plate (a sensitive material) so as to fabricate a second hologram, and the second hologram is fabricated as a holographic stereogram which can reconstruct the three-dimensional object having visualized cross-sectional surfaces.

Though the example of FIG. 19 and FIG. 20 has been described as an example in which the original image data to be recorded in the element holograms $a_1$ to $a_N$ of the holographic stereogram are sequentially switched and displayed on the display (liquid crystal panel 55) and the original image data displayed on the display (liquid crystal panel 55) are recorded as the element holograms $a_1$ to $a_N$, the original image data may be recorded as disclosed in Non-patent document 8 and Non-patent document 9. That is, the original image data may be recorded in a film once and the original image data recorded on the film are sequentially projected while sending the film forth and are recorded as the element holograms $a_1$ to $a_N$.

Though the computer-generated hologram and the holographic stereogram in which the three-dimensional object having visualized cross-sectional surfaces is recorded and the fabrication methods for the same of the present invention have been described based on the principles thereof and the embodiments thereof, the present invention is not limited to the embodiments and various modifications may be made. For example, though the two-dimensional cross-sectional image data obtained in the step ST11 of FIG. 1 were mutually parallel cross-sectional data, these may be a number of two-dimensional cross-sectional image data of cross sections obtained by gradually rotating around a single axis.

Moreover, if a computer-generated hologram or a holographic stereogram in which a three-dimensional object having visualized cross-sectional surfaces is recorded of the present invention as mentioned above is attached to a predetermined position of a printed matter such as a magazine, a book, or the like, a third person can easily observe the three-dimensional object abound in reality because the cross section thereof is visualized.

INDUSTRIAL APPLICABILITY

According to a computer-generated hologram and a holographic stereogram in which the three-dimensional object having visualized cross-sectional surfaces is recorded and fabrication methods for the same of the present invention, a three-dimensional structure obtained by processing two-dimensional cross-sectional image data or a three-dimensional structure obtained by processing volume data can be recorded in a computer-generated hologram or a holographic stereogram which is able to reconstruct the three-dimensional structure as a stereoimage, and can be recorded such that the three-dimensional structure which is cut along a given cross section can be reconstructed with visualized cross-sectional surfaces on the cross section. Further, a computer-generated hologram can be fabricated which can switch to reconstruct the whole shape and the shape when cut along a given cross section of a three-dimensional object as stereoimages. Furthermore, by attaching such a computer-generated hologram or a holographic stereogram in which a three-dimensional object is reconstructably recorded to a printed matter as a medium, it is possible to distribute the holograms or stereograms widely to third persons.

What is claimed:

1. A fabrication method for a computer-generated hologram in which a three-dimensional object having visualized cross-sectional surfaces is recorded, including:
    a step of obtaining volume data of the three-dimensional object;
    a step of producing three-dimensional image data composed only of surface data of the three-dimensional object from the volume data obtained in the above step;
    a step of cutting the three-dimensional image data composed only of the surface data, produced in the above step, along a predetermined cross section;
    a step of defining the shape of the three-dimensional object to be recorded in a hologram by adding polygon surface data representing cross-sectional surfaces on the cut cross section to the same;
    a step of defining the arrangement of the three-dimensional object defined in the above step, a hologram plane, and a reference beam to compute interference fringes on the hologram plane; and
    a step of recording the interference fringes computed in the above step onto a recording medium.

2. A fabrication method for a computer-generated hologram in which a three-dimensional object having visualized cross-sectional surfaces is recorded as claimed in claim 1, wherein said volume data of the three-dimensional object are obtained by an X-ray CT (computer tomography), an MRI (magnetic resonance), or a TEM (transmittance electron microscope).

3. A computer-generated hologram in which a three-dimensional object having visualized cross-sectional surfaces is recorded, wherein the computer-generated hologram is fabricated by a fabrication method for a computer-generated hologram in which a three-dimensional object having visualized cross-sectional surfaces is recorded as claimed in claim 2.

4. A computer-generated hologram in which a three-dimensional object having visualized cross-sectional surfaces is recorded, wherein the computer-generated hologram is fabricated by a fabrication method for a computer-generated hologram in which a three-dimensional object having visualized cross-sectional surfaces is recorded as claimed in claim 1.

5. A printed matter with a computer-generated hologram attached at a predetermined position thereof, wherein the computer-generated hologram is fabricated by the method of claim 1.

* * * * *